United States Patent
Mizrahi

(10) Patent No.: US 9,889,634 B2
(45) Date of Patent: *Feb. 13, 2018

(54) FORMABLE LIGHT WEIGHT COMPOSITES

(71) Applicant: Productive Research LLC, West Bloomfield, MI (US)

(72) Inventor: Shimon Mizrahi, Haifa (IL)

(73) Assignee: PRODUCTIVE RESEARCH LLC, West Bloomfield, MI (US)

(*) Notice: Subject to any disclaimer, the term of this patent is extended or adjusted under 35 U.S.C. 154(b) by 2 days.

This patent is subject to a terminal disclaimer.

(21) Appl. No.: 15/227,495

(22) Filed: Aug. 3, 2016

(65) Prior Publication Data

US 2016/0339675 A1 Nov. 24, 2016

Related U.S. Application Data

(63) Continuation of application No. 13/939,666, filed on Jul. 11, 2013, now Pat. No. 9,434,134, which is a
(Continued)

(51) Int. Cl.
*B32B 15/04* (2006.01)
*B32B 15/18* (2006.01)
(Continued)

(52) U.S. Cl.
CPC ............ *B32B 15/085* (2013.01); *B23K 11/11* (2013.01); *B29C 70/025* (2013.01);
(Continued)

(58) Field of Classification Search
CPC ....... B32B 15/043; B32B 15/08; B32B 15/18; B32B 15/20; B32B 7/12; B32B 27/281;
(Continued)

(56) References Cited

U.S. PATENT DOCUMENTS

| 213,015 A | 3/1879 | Wahl et al. |
| 777,656 A | 12/1904 | Banning |

(Continued)

FOREIGN PATENT DOCUMENTS

| CA | 1182004 A | 2/1985 |
| CA | 1290533 C | 10/1991 |

(Continued)

OTHER PUBLICATIONS

"The Effect of Electrical Resistance on Nugget Formation During Spot Welding", J.G. Kaiser, G.J. Dunn, and T.W. Eagar, Welding Research Supplement, Jun. 1982, pp. 167-s to 174-s.
(Continued)

*Primary Examiner* — Kevin R Kruer

(74) *Attorney, Agent, or Firm* — The Dobrusin Law Firm, P.C.

(57) ABSTRACT

The present invention relates to light weight composite materials which comprise a metallic layer and a polymeric layer, the polymeric layer containing a filled thermoplastic polymer which includes a thermoplastic polymer and a metallic fiber. The composite materials of the present invention may be formed using conventional stamping equipment at ambient temperatures. Composite materials of the present invention may also be capable of being welded to other metal materials using a resistance welding process such as resistance spot welding.

20 Claims, 3 Drawing Sheets

Related U.S. Application Data continuation of application No. 13/052,292, filed on Mar. 21, 2011, now Pat. No. 8,540,842, which is a continuation of application No. 12/540,771, filed on Aug. 13, 2009, now Pat. No. 7,927,708.

(60) Provisional application No. 61/181,511, filed on May 27, 2009, provisional application No. 61/089,704, filed on Aug. 18, 2008.

(51) Int. Cl.

| | | |
|---|---|---|
| *B32B 15/08* | (2006.01) | |
| *B32B 7/12* | (2006.01) | |
| *B32B 27/36* | (2006.01) | |
| *B32B 27/32* | (2006.01) | |
| *B32B 27/38* | (2006.01) | |
| *B32B 27/40* | (2006.01) | |
| *B23K 11/11* | (2006.01) | |
| *B29C 70/02* | (2006.01) | |
| *B29C 35/16* | (2006.01) | |
| *B32B 15/085* | (2006.01) | |
| *B29C 70/08* | (2006.01) | |
| *B32B 15/20* | (2006.01) | |
| *B32B 27/28* | (2006.01) | |
| *B32B 27/30* | (2006.01) | |
| *B32B 27/34* | (2006.01) | |
| *B23K 103/16* | (2006.01) | |
| *B29K 305/00* | (2006.01) | |
| *B29K 705/02* | (2006.01) | |
| *B29K 705/12* | (2006.01) | |

(52) U.S. Cl.
CPC .......... *B29C 70/028* (2013.01); *B29C 70/088* (2013.01); *B32B 7/12* (2013.01); *B32B 15/043* (2013.01); *B32B 15/08* (2013.01); *B32B 15/18* (2013.01); *B32B 15/20* (2013.01); *B32B 27/281* (2013.01); *B32B 27/30* (2013.01); *B32B 27/32* (2013.01); *B32B 27/34* (2013.01); *B32B 27/36* (2013.01); *B32B 27/365* (2013.01); *B32B 27/38* (2013.01); *B32B 27/40* (2013.01); *B23K 2203/16* (2013.01); *B23K 2203/172* (2015.10); *B29K 2305/00* (2013.01); *B29K 2705/02* (2013.01); *B29K 2705/12* (2013.01); *B32B 2250/40* (2013.01); *B32B 2262/103* (2013.01); *B32B 2264/105* (2013.01); *B32B 2264/108* (2013.01); *B32B 2270/00* (2013.01); *B32B 2307/306* (2013.01); *B32B 2307/54* (2013.01); *B32B 2419/00* (2013.01); *B32B 2605/00* (2013.01); *B32B 2607/00* (2013.01); *Y10T 156/1041* (2015.01); *Y10T 428/12389* (2015.01); *Y10T 428/12444* (2015.01); *Y10T 428/12486* (2015.01); *Y10T 428/12569* (2015.01); *Y10T 428/2495* (2015.01); *Y10T 428/24967* (2015.01); *Y10T 428/24994* (2015.04); *Y10T 428/31678* (2015.04)

(58) Field of Classification Search
CPC ......... B32B 27/30; B32B 27/32; B32B 27/36; B32B 27/365; B32B 27/38; B32B 27/40; B32B 2250/40; B32B 2262/103; B32B 2264/105; B32B 2264/108; B32B 2270/00; B32B 2307/306; B32B 2307/54; B32B 2419/00; B32B 2605/00; B32B 2607/00; Y10T 156/1041; Y10T 428/12389; Y10T 428/12444; Y10T 428/12486; Y10T 428/12569; Y10T 428/2495; Y10T 428/31678; Y10T 428/24994; B23K 11/11; B23K 2203/16; B28C 70/025; B28C 70/028; B28C 70/088; B29K 2305/00; B29K 2705/02; B29K 2705/12

See application file for complete search history.

(56) References Cited

U.S. PATENT DOCUMENTS

| | | |
|---|---|---|
| 1,972,835 A | 9/1934 | Tainton |
| 2,286,980 A | 6/1942 | Schanz |
| 3,086,899 A | 4/1963 | Smith et al. |
| 3,112,213 A | 11/1963 | Lusa |
| 3,205,337 A | 9/1965 | Hiemenz |
| 3,527,667 A | 9/1970 | Larsen et al. |
| 3,764,277 A | 10/1973 | Hollis |
| 3,832,433 A | 8/1974 | Schaffer et al. |
| 3,900,651 A | 8/1975 | Hoppe et al. |
| 3,969,868 A | 7/1976 | Bainter et al. |
| 4,037,073 A | 7/1977 | Becker |
| 4,048,355 A | 9/1977 | Sakayori et al. |
| 4,110,117 A | 8/1978 | McLeod |
| 4,110,505 A | 8/1978 | Prewo |
| 4,171,394 A | 10/1979 | Patil et al. |
| 4,229,504 A | 10/1980 | Brachman |
| 4,255,482 A | 3/1981 | Udagawa |
| 4,267,679 A | 5/1981 | Thompson |
| 4,313,996 A | 2/1982 | Newman et al. |
| 4,329,561 A | 5/1982 | Schafer et al. |
| 4,330,587 A | 5/1982 | Woodbrey |
| 4,353,951 A | 10/1982 | Yukitoshi et al. |
| 4,369,222 A | 1/1983 | Hedrick et al. |
| 4,369,830 A | 1/1983 | Generali |
| 4,383,942 A | 5/1983 | Davenport |
| 4,421,892 A | 12/1983 | Kasahara et al. |
| 4,424,254 A | 1/1984 | Hedrick et al. |
| 4,429,076 A | 1/1984 | Saito et al. |
| 4,461,665 A | 7/1984 | Schertler |
| 4,474,685 A | 10/1984 | Annis |
| 4,482,600 A | 11/1984 | Matsumoto et al. |
| 4,513,033 A | 4/1985 | Patil et al. |
| 4,522,875 A | 6/1985 | Still, Jr. et al. |
| 4,601,941 A | 7/1986 | Lutz et al. |
| 4,617,231 A | 10/1986 | Hamada et al. |
| 4,650,723 A | 3/1987 | Furuya |
| 4,650,951 A | 3/1987 | Koga et al. |
| 4,668,545 A | 5/1987 | Lowe |
| 4,678,699 A | 7/1987 | Gregor et al. |
| 4,678,707 A | 7/1987 | Shinozaki et al. |
| 4,690,856 A | 9/1987 | Ito et al. |
| 4,749,623 A | 6/1988 | Endo et al. |
| 4,753,850 A | 6/1988 | Ibe et al. |
| 4,758,627 A | 7/1988 | Wilkus et al. |
| 4,759,972 A | 7/1988 | Yoshiga et al. |
| 4,759,994 A | 7/1988 | Lesourd |
| 4,788,099 A | 11/1988 | Fukushima et al. |
| 4,792,499 A | 12/1988 | Shindou et al. |
| 4,794,050 A | 12/1988 | Campbell et al. |
| 4,857,377 A | 8/1989 | Daimon et al. |
| 4,873,149 A | 10/1989 | Shinoda et al. |
| 4,888,247 A | 12/1989 | Zweben et al. |
| 4,937,125 A | 6/1990 | Lepoetre et al. |
| 4,942,193 A | 7/1990 | Van Buskirk et al. |
| 4,978,582 A | 12/1990 | Stamm et al. |
| 5,030,488 A | 7/1991 | Sobolev |
| 5,030,816 A | 7/1991 | Strecker |
| 5,047,479 A | 9/1991 | Ohmae et al. |
| 5,061,778 A | 10/1991 | Uchida et al. |
| 5,063,098 A | 11/1991 | Niwa et al. |
| 5,084,357 A | 1/1992 | Imai et al. |
| 5,093,204 A | 3/1992 | Watanabe et al. |
| 5,100,737 A | 3/1992 | Colombier et al. |
| 5,176,852 A | 1/1993 | Kondo et al. |
| 5,216,075 A | 6/1993 | Papazoglou |
| 5,219,629 A | 6/1993 | Sobolev |
| 5,227,216 A | 7/1993 | Pettit |

(56) References Cited

U.S. PATENT DOCUMENTS

| | | |
|---|---|---|
| 5,278,231 A | 1/1994 | Chundury |
| 5,347,099 A | 9/1994 | Gissinger et al. |
| 5,354,607 A | 10/1994 | Swift et al. |
| 5,410,133 A | 4/1995 | Matsein et al. |
| 5,418,073 A | 5/1995 | Loth et al. |
| 5,489,180 A | 2/1996 | Ichihara et al. |
| 5,518,836 A | 5/1996 | McCullough |
| 5,548,027 A | 8/1996 | Heucher et al. |
| 5,578,384 A | 11/1996 | Kingston |
| 5,604,033 A | 2/1997 | Arthurs et al. |
| 5,614,930 A | 3/1997 | Osborne et al. |
| 5,658,264 A | 8/1997 | Samson |
| 5,679,441 A | 10/1997 | Saelens et al. |
| 5,691,037 A | 11/1997 | McCutcheon et al. |
| 5,753,885 A | 5/1998 | Iwasa et al. |
| 5,778,813 A | 7/1998 | Kennedy |
| 5,846,461 A | 12/1998 | Collins et al. |
| 5,866,215 A | 2/1999 | Karbhari |
| 5,866,868 A | 2/1999 | Hirane |
| 5,894,045 A | 4/1999 | Desrondiers |
| 5,916,469 A | 6/1999 | Scoles et al. |
| 5,939,213 A | 8/1999 | Bowden et al. |
| 5,939,512 A | 8/1999 | Gervasi et al. |
| 5,951,800 A | 9/1999 | Pettit |
| 6,004,650 A | 12/1999 | Schweizer |
| 6,012,493 A | 1/2000 | Remke et al. |
| 6,050,208 A | 4/2000 | Kennedy |
| 6,090,465 A | 7/2000 | Steele et al. |
| 6,099,055 A | 8/2000 | Hirota et al. |
| 6,126,865 A | 10/2000 | Haak et al. |
| 6,138,435 A | 10/2000 | Kocher et al. |
| 6,146,488 A | 11/2000 | Okada et al. |
| 6,177,173 B1 | 1/2001 | Nelson |
| 6,202,462 B1 | 3/2001 | Hansen et al. |
| 6,268,408 B1 | 7/2001 | Dispenza |
| 6,294,257 B1 | 9/2001 | Tsukakoshi et al. |
| 6,346,292 B1 | 2/2002 | Grubb et al. |
| 6,346,491 B1 | 2/2002 | DeAngelis et al. |
| 6,387,535 B1 | 5/2002 | Mantel |
| 6,428,905 B1 | 8/2002 | Behr et al. |
| 6,455,148 B1 | 9/2002 | Spears et al. |
| 6,465,110 B1 | 10/2002 | Boss et al. |
| 6,534,194 B2 | 3/2003 | Weihs et al. |
| 6,592,968 B1 | 7/2003 | Schmit et al. |
| 6,592,979 B1 | 7/2003 | Deteresa |
| 6,659,518 B2 | 12/2003 | Ponsonnaille et al. |
| 6,673,468 B1 | 1/2004 | Behr et al. |
| 6,741,221 B2 | 5/2004 | Aisenbrey |
| 6,764,772 B2 | 7/2004 | Clyne et al. |
| 6,841,212 B2 | 1/2005 | Bicakci-Jenkins et al. |
| 6,841,252 B2 | 1/2005 | Kroes et al. |
| 6,861,156 B2 | 3/2005 | Palm |
| 6,865,805 B2 | 3/2005 | Dispenza et al. |
| 6,870,516 B2 | 3/2005 | Aisenbrey |
| 7,157,140 B1 | 1/2007 | Hoppe et al. |
| 7,261,932 B2 | 8/2007 | Kennedy |
| 7,316,838 B2 | 1/2008 | Aisenbrey |
| 7,390,564 B2 | 6/2008 | Yuasa et al. |
| 7,459,115 B2 | 12/2008 | Stadler et al. |
| 7,553,553 B2 | 6/2009 | Palumbo |
| 7,569,624 B2 | 8/2009 | Kolbe et al. |
| 7,592,388 B2 | 9/2009 | Wick et al. |
| 7,648,058 B2 | 1/2010 | Straza |
| 7,748,184 B1 | 7/2010 | Wheeler et al. |
| 7,833,630 B2 | 11/2010 | Sigler |
| 7,879,454 B2 | 2/2011 | Manicke |
| 7,927,708 B2 | 4/2011 | Mizrahi |
| 7,959,058 B2 | 6/2011 | Crane |
| 7,981,501 B2 | 7/2011 | Kwag et al. |
| 8,034,428 B2 | 10/2011 | Verhaeghe |
| 8,071,205 B2 | 12/2011 | Tsuchiya |
| 8,186,566 B2 | 5/2012 | Abramovici et al. |
| 8,216,658 B2 | 7/2012 | Abdoel Faziel Rajabali |
| 8,308,225 B2 | 11/2012 | Owen et al. |
| 8,309,004 B2 | 11/2012 | Pinard |
| 8,328,971 B2 | 12/2012 | Kia et al. |
| 8,344,070 B2 | 1/2013 | Squire et al. |
| 8,397,976 B2 | 3/2013 | Abramovici et al. |
| 8,404,352 B2 | 3/2013 | Schwab et al. |
| 8,475,930 B2 | 7/2013 | Shoji et al. |
| 8,518,521 B2 | 8/2013 | Aso et al. |
| 8,573,357 B1 | 11/2013 | Hibbs |
| 8,852,733 B2 | 10/2014 | Kwag et al. |
| 8,888,169 B2 | 11/2014 | Howe et al. |
| 8,889,263 B2 | 11/2014 | Rice |
| 9,115,264 B2 | 8/2015 | Mizrahi et al. |
| 2002/0108678 A1 | 8/2002 | Montano et al. |
| 2002/0160180 A1 | 10/2002 | Yamamoto et al. |
| 2003/0064241 A1 | 4/2003 | Suzuki et al. |
| 2003/0082335 A1 | 5/2003 | Clyne et al. |
| 2003/0099857 A1 | 5/2003 | Nomura et al. |
| 2003/0162049 A1 | 8/2003 | De Muijnck et al. |
| 2004/0116602 A1 | 6/2004 | Botros |
| 2004/0222863 A1 | 11/2004 | Aisenbrey |
| 2004/0227688 A1 | 11/2004 | Aisenbrey |
| 2004/0233112 A1 | 11/2004 | Aisenbrey |
| 2004/0239578 A1 | 12/2004 | Aisenbrey |
| 2004/0244789 A1 | 12/2004 | Jentgens |
| 2004/0247927 A1 | 12/2004 | Kurz |
| 2005/0000947 A1 | 1/2005 | Sigler et al. |
| 2005/0001780 A1 | 1/2005 | Aisenbrey |
| 2005/0133575 A1 | 6/2005 | Gayden et al. |
| 2005/0140042 A1 | 6/2005 | Aisenbrey |
| 2005/0166956 A1 | 8/2005 | Aisenbrey |
| 2005/0181203 A1 | 8/2005 | Rawlings et al. |
| 2005/0204544 A1 | 9/2005 | Aisenbrey |
| 2005/0205712 A1 | 9/2005 | Aisenbrey |
| 2005/0206270 A1 | 9/2005 | Aisenbrey |
| 2005/0206289 A1 | 9/2005 | Aisenbrey |
| 2005/0206491 A1 | 9/2005 | Aisenbrey |
| 2005/0208251 A1 | 9/2005 | Aisenbrey |
| 2005/0208862 A1 | 9/2005 | Aisenbrey |
| 2005/0212161 A1 | 9/2005 | Aisenbrey |
| 2005/0212162 A1 | 9/2005 | Aisenbrey |
| 2005/0214553 A1 | 9/2005 | Yannetti et al. |
| 2005/0224280 A1 | 10/2005 | Aisenbrey |
| 2005/0271859 A1 | 12/2005 | Tuss |
| 2006/0003667 A1 | 1/2006 | Aisenbrey |
| 2006/0010807 A1 | 1/2006 | Whitley |
| 2006/0060296 A1 | 3/2006 | Sigler et al. |
| 2006/0060690 A1 | 3/2006 | Aisenbrey |
| 2006/0062977 A1 | 3/2006 | Sigler et al. |
| 2006/0071862 A1 | 4/2006 | Aisenbrey |
| 2006/0091887 A1 | 5/2006 | Aisenbrey |
| 2006/0134395 A1 | 6/2006 | Sigler et al. |
| 2006/0134449 A1 | 6/2006 | Sigler et al. |
| 2006/0134450 A1 | 6/2006 | Sigler et al. |
| 2006/0222869 A1 | 10/2006 | Cai et al. |
| 2006/0269701 A1 | 11/2006 | Gauriat et al. |
| 2006/0269738 A1 | 11/2006 | Kimberly |
| 2006/0286333 A1 | 12/2006 | Wang et al. |
| 2007/0062758 A1 | 3/2007 | Jensen et al. |
| 2007/0104966 A1 | 5/2007 | Calvez et al. |
| 2007/0184288 A1 | 8/2007 | Garamszegi et al. |
| 2007/0186614 A1 | 8/2007 | Pinard |
| 2007/0187469 A1 | 8/2007 | Chen et al. |
| 2007/0196637 A1 | 8/2007 | Good et al. |
| 2007/0295704 A1 | 12/2007 | Sigler et al. |
| 2008/0012389 A1 | 1/2008 | Mittermeier et al. |
| 2008/0032094 A1 | 2/2008 | Raghavendran et al. |
| 2008/0036241 A1 | 2/2008 | Aisenbrey |
| 2008/0036251 A1 | 2/2008 | Endo et al. |
| 2008/0081149 A1 | 4/2008 | Fuerst et al. |
| 2008/0254310 A1 | 10/2008 | Palumbo et al. |
| 2008/0311363 A1 | 12/2008 | Haskett et al. |
| 2009/0020187 A1 | 1/2009 | Russell et al. |
| 2009/0142538 A1 | 6/2009 | Sigler et al. |
| 2009/0159034 A1 | 6/2009 | Katayama et al. |
| 2009/0226755 A1 | 9/2009 | Sigler et al. |
| 2009/0280348 A1 | 11/2009 | Patberg et al. |
| 2010/0035080 A1 | 2/2010 | Sigler et al. |
| 2010/0040902 A1 | 2/2010 | Mizrahi |
| 2010/0084380 A1 | 4/2010 | Tetzlaff et al. |
| 2010/0098929 A1 | 4/2010 | Dispenza |

(56) References Cited

U.S. PATENT DOCUMENTS

| | | |
|---|---|---|
| 2010/0196736 A1 | 8/2010 | Boger et al. |
| 2010/0233505 A1 | 9/2010 | Boger et al. |
| 2011/0049913 A1 | 3/2011 | Bernt et al. |
| 2011/0052910 A1 | 3/2011 | Gunnink et al. |
| 2011/0200816 A1 | 8/2011 | Mizrahi et al. |
| 2012/0115872 A1 | 8/2012 | Mizrahi et al. |
| 2012/0196138 A1 | 8/2012 | Botros et al. |
| 2013/0136944 A1 | 5/2013 | Mizrahi et al. |
| 2013/0281576 A1 | 10/2013 | Kobayashi et al. |
| 2014/0034233 A1 | 2/2014 | Vanswedent et al. |
| 2014/0162086 A1 | 6/2014 | Mizrahi |

FOREIGN PATENT DOCUMENTS

| | | |
|---|---|---|
| CA | 2041560 A1 | 11/1991 |
| CA | 2389078 A1 | 5/2001 |
| CA | 2478937 A1 | 9/2003 |
| CA | 2509699 A1 | 7/2004 |
| CA | 2546109 A1 | 6/2005 |
| CA | 2064041 C | 7/2006 |
| CA | 2700549 A1 | 4/2009 |
| CA | 2729589 A1 | 2/2010 |
| CA | 2731111 A1 | 3/2010 |
| CA | 2842609 A1 | 2/2012 |
| CA | 2859630 A1 | 7/2013 |
| CH | 284305 | 7/1952 |
| CH | 287794 | 12/1952 |
| CH | 406580 | 1/1966 |
| CN | 1649724 A | 8/2005 |
| DE | 877057 | 5/1953 |
| DE | 1912948 | 10/1970 |
| DE | 1729057 | 6/1971 |
| DE | 3622781 A1 | 1/1988 |
| DE | 4019202 A1 | 12/1991 |
| DE | 4141343 A1 | 5/1993 |
| DE | 4307563 A1 | 9/1993 |
| DE | 4300283 A1 | 7/1994 |
| DE | 19633306 A1 | 10/1997 |
| DE | 19724361 A1 | 1/1998 |
| DE | 19740844 A1 | 3/1999 |
| DE | 19810706 A1 | 9/1999 |
| DE | 19919783 | 11/2000 |
| DE | 19926379 A1 | 12/2000 |
| DE | 10011589 A1 | 9/2001 |
| DE | 10240384 A1 | 3/2004 |
| DE | 102004022677 A1 | 5/2004 |
| DE | 202004015784 | 4/2005 |
| DE | 102006013529 A1 | 10/2006 |
| DE | 102006049014 A1 | 4/2008 |
| DE | 102006049015 A1 | 4/2008 |
| DE | 102012103793 A | 10/2013 |
| EP | 19835 A1 | 12/1980 |
| EP | 0069401 | 1/1983 |
| EP | 0032355 B1 | 5/1984 |
| EP | 0208443 | 6/1986 |
| EP | 0249442 A2 | 3/1987 |
| EP | 0311722 A1 | 7/1989 |
| EP | 0322947 B1 | 7/1989 |
| EP | 0335642 A2 | 10/1989 |
| EP | 0354521 A2 | 2/1990 |
| EP | 0356837 B1 | 3/1990 |
| EP | 0642920 A2 | 3/1995 |
| EP | 888880 A1 | 1/1999 |
| EP | 1034920 | 9/2000 |
| EP | 1044796 A2 | 10/2000 |
| EP | 1095718 A1 | 5/2001 |
| EP | 1197323 A1 | 4/2002 |
| EP | 1491328 A1 | 12/2004 |
| EP | 1504892 A1 | 2/2005 |
| FR | 1245009 | 11/1960 |
| GB | 2062057 A | 5/1981 |
| GB | 2332875 A | 7/1999 |
| JP | 54-52182 A | 4/1979 |
| JP | 56132709 A | 10/1981 |
| JP | S57-34949 A | 2/1982 |
| JP | 57-077065 A | 5/1982 |
| JP | 58-142844 A | 8/1983 |
| JP | S58-142845 A | 8/1983 |
| JP | 58-180037 | 10/1983 |
| JP | S58-180037 U | 12/1983 |
| JP | 60-068180 A | 4/1985 |
| JP | 60-201296 A | 10/1985 |
| JP | S61010445 A | 1/1986 |
| JP | 61029262 U | 7/1986 |
| JP | S63-242536 A | 10/1986 |
| JP | 61-290044 A | 12/1986 |
| JP | 62-151332 A | 7/1987 |
| JP | S62-187022 A | 8/1987 |
| JP | 63-027248 A | 2/1988 |
| JP | S63-193831 A | 8/1988 |
| JP | 01154876 A | 4/1989 |
| JP | H01-108207 A | 4/1989 |
| JP | 01-263043 A | 10/1989 |
| JP | 2050827 A | 2/1990 |
| JP | H02-297432 A | 7/1990 |
| JP | 02-231134 A | 9/1990 |
| JP | 2297432 A | 12/1990 |
| JP | 03-193443 A | 8/1991 |
| JP | 04-077245 A | 3/1992 |
| JP | 04-094928 A | 3/1992 |
| JP | 04-127972 A | 4/1992 |
| JP | 04-282239 A | 7/1992 |
| JP | 05-039560 A | 2/1993 |
| JP | 05-039561 A | 2/1993 |
| JP | 5050553 A | 3/1993 |
| JP | 05-138802 A | 6/1993 |
| JP | 5-162237 A | 6/1993 |
| JP | 05-229054 A | 9/1993 |
| JP | 05-229055 A | 9/1993 |
| JP | 06-071806 A | 3/1994 |
| JP | 06-198802 A | 7/1994 |
| JP | 07-068701 A | 3/1995 |
| JP | 07-276557 A | 10/1995 |
| JP | 08-224827 A | 9/1996 |
| JP | 09-087528 A | 3/1997 |
| JP | 63-158242 A | 7/1998 |
| JP | 10-2373131 A | 9/1998 |
| JP | H11-123790 A | 5/1999 |
| JP | 2000-263697 A | 9/2000 |
| JP | 2001-059187 A | 3/2001 |
| JP | 2011-192792 A | 7/2011 |
| JP | 2013-515613 A | 5/2013 |
| JP | 2013-519543 A | 5/2013 |
| KR | 10-2004-0102231 A | 12/2004 |
| NL | 8203423 A | 4/1984 |
| RU | 2149788 C1 | 5/2000 |
| WO | 1995/027975 A1 | 10/1995 |
| WO | 1999/029492 A1 | 6/1999 |
| WO | 1999/046461 A1 | 9/1999 |
| WO | 2000/013892 A1 | 3/2000 |
| WO | 2003/037970 A1 | 5/2003 |
| WO | 2007/061304 A1 | 5/2007 |
| WO | 2007/062061 A2 | 5/2007 |
| WO | 2008/118694 A1 | 10/2008 |
| WO | 2009/027480 A1 | 3/2009 |
| WO | 2009/043777 A2 | 4/2009 |
| WO | 2009/135786 A1 | 11/2009 |
| WO | 2010/021899 A1 | 2/2010 |
| WO | 2012/126923 A1 | 9/2012 |
| WO | 2013/062642 A1 | 5/2013 |
| WO | 2013/156166 A1 | 10/2013 |
| WO | 2013/164173 A1 | 11/2013 |
| WO | 2013/178698 A1 | 12/2013 |
| WO | 2014/009114 A1 | 1/2014 |
| WO | 2014/066569 A1 | 5/2014 |

OTHER PUBLICATIONS

Abstract for: Dunnand, M., et al., "USILIGHT: A cost effective solution to lighten cars", SAE Technical Paper Series, Apr. 3-6, 2006, pp. 1-10.
Abstract for: Guttman, H., et al. "Galfan—A new Coating for Automotive Tubing", SAE Technical Paper 860274, 1986.

(56) References Cited

OTHER PUBLICATIONS

Abstract for: Herrschaft, D. et al., "Galfan—A New Zinc-Alloy Coated Steel for Automotive Body Use", SAE Technical Paper 830517, 1983.
Abstract for: Murase, M., et al., "Development of vibration damping steel sheets for automobile oil pans", SAE Internation Congress and Exposition, Mar. 1-5, 1993; Paper No. 930023; Kawasaki Steel Corp.
Abstract for: Shimizu, T. et al., "Application of hot-dip Zn—6%Al—3%Mg Alloy Coated Steel Sheet to Automotive Body", SAE Technical Paper No. 2005-01-1330, SAE 2005 World Congress & Exhibition, Apr. 2005.
Abstract for: Welch, T. et al., "Cost and Performance Benefits for Laminated Steel Body", SAE Technical Paper 1999-01-1784, 1999.
Advisory Action dated Jun. 30, 2015; U.S. Appl. No. 13/027,423.
Cambridge University, Department of Materials and Metallurgy, Newsletter (Cambridge Material Eyes), "The Gordon Laboratory, 2001," published Aug. 2001 (Issue 11), p. 2.
Co-Pending U.S. Appl. No. 12/978,974 Office Action, dated Mar. 25, 2013.
Copending Office Action, U.S. Appl. No. 13/027,423 dated Sep. 25, 2015.
Co-pending PCT Patent application No. PCT/US2011/046778 filed on Aug. 5, 2011 and published as WO 2012/019115 A1 dated Feb. 8, 2012 by Mizrahi et al.
Copending PCT Patent Application PCT/US2012/025619 filed on Feb. 17, 2012.
Copending U.S. Appl. No. 13/795,856, filed Mar. 12, 2013 and published as 20140034233.
Copending U.S. Appl. No. 13/814,352, filed Feb. 5, 2013 by Mizrahi and published as US20130136944).
Co-Pending U.S. Appl. No. 12/978,974, filed Dec. 27, 2010 by Mizrahi et al.
Co-Pending U.S. Appl. No. 13/027,423, filed Feb. 15, 2011 by Mizrahi et al.
Co-pending U.S. Appl. No. 12/105,478, filed Feb. 17, 2012 2012 by Mizrahi et al.
DiCello, J.A., "Steel-Polypropylene-Steel Laminate—A New Weight Reduction Material," SAE Congress and Exposition, Detroit, MI, Feb. 25-29, 1980.
Gunnink, J.W. GLARE: An Improved Damage Tolerance Material. Proc. 19th European Conference on materials for Aerospace Applications, Dec. 6-8, 2000, pp. 17-24.
Haward, R.N., "Strain Hardening of Thermoplastics," Macromolecules 1993, 26, 5860-5869.
International search report for copending PCT Patent Application PCT/US2012/025619 filed on Feb. 17, 2012 and dated May 29, 2012.
Japanese Office Action dated Apr. 24, 2013 for co-pending Japanese Patent Application No. 2011-523875 with summary of the novelty and inventive step rejections prepared by Kiyohara & Co Patent Attorney dated May 22, 2013.
Japanese Office Action dated Apr. 24, 2013 for co-pending Japanese Patent Application No. 2011-523874 with brief description prepared by Kiyohara & Co Patent Attorney dated Apr. 26, 2013.
Japanese Office Action dated Dec. 22, 2014, Application No. 2012-546253.
Japanese Office Action dated Jan. 20, 2014, Application No. 2012-553092.
Japanese Office Action dated Mar. 30, 2015, Application No. 2013-523364.
Kim et al., "Formability of AA5182/polypropylene/AA5182 Sandwhich Sheets", J. of Mat. Processing Tech., 139 (2003) 1-7.
Kim et al., "Forming and Failure Behaviour of Coated, Laminated and Sandwiched Sheet Metals: A Review", J. of Mat. Processing Tech., 63 (1997) 38-42.
Link, Todd M. "Formability and Performance of Steel-Plastic Steel Laminated Sheet Materials", SAE 2001 World Congress, Detroit, MI, Mar. 5-8, 2001.
Markaki, A.E. and T.W. Clyne, "Mechanics of Thin Ultra-Light Stainless Steel Sandwich Sheet Material, Part I. Stiffness," Acta Materialia 51 (2003) 1341-1350.
Markaki, A.E. and T.W. Clyne, "Mechanics of Thin Ultra-Light Stainless Steel Sandwich Sheet Material, Part II. Resistance to Delamination," Acta Materialia 51 (2003) 1351-1357.
Markaki, A.E., S.A. Westgate, and T.W. Clyne, "The Stiffness and Weldability of an Ultra-Light Steel Sandwich shhet Maerial with a Fibrous Metal Core," In Processing and Properties of Lightweight Cellular Metals and Structures, TMS, 2002, pp. 15-24.
McKenna, L.W. et al., "New Light-Weight Materials for Vehicle Body Panels—Aluminum/Nylon Laminates," SAE Congress and Exposition, Detroit, MI, Feb. 25-29, 1980.
Miller, William K. "Metal-Plastic Laminates for Vehicle Weight Reduction," SAE Congress and Exposition, Detroit, MI, Feb. 25-29, 1980.
Mohr et al. Development of Formable Sandwich Seets for Automotive Applications, Adv. Eng. Materials, 7 (2005) 243-246.
Mohr, Dirk, "On the Role of Shear Strength in Sandwich Sheet Forming," International Journal of Solids and Structures 42 (2005) 1491-1512.
Notice of allowance from the US Patent Office for copending U.S. Appl. No. 13/814,352, dated May 26, 2015.
Notice of allowance from the US Patent Office for copending U.S. Appl. No. 13/814,352, dated Jun. 17, 2015.
Office Action dated Apr. 21, 2015 for copending U.S. Appl. No. 13/027,423.
Office Action dated Dec. 17, 2013 for copending U.S. Appl. No. 12/978,974.
Office Action dated Dec. 4, 2013 for copending U.S. Appl. No. 13/027,423.
Office Action dated Jan. 13, 2015 for copending U.S. Appl. No. 13/814,352.
Office Action dated Mar. 28, 2013 for co-pending U.S. Appl. No. 13/027,423.
Office Action dated Nov. 6, 2014 for copending U.S. Appl. No. 13/027,423.
Office Action from the Chinese Patent Office for CN application No. 201280018239 dated May 26, 2015.
Office Action from the European Patent Office for EP application No. 11748818.9 dated Jul. 2, 2015.
Office Action from the China State Intellectual Property Office for China Patent Application No. 2011800192082 dated May 4, 2014.
Office Action from the China State Intellectual Property Office for China Patent Application No. 201080064854.6 dated Sep. 18, 2014.
Office Action from the China State Intellectual Property Office for China Patent Application No. 201280018239.0 dated Sep. 19, 2014.
Office Action from the European Patent Office for Europe Patent Application No. 11748818.9 dated Oct. 2, 2014.
Office Action from the Japan Patent Office for JP Application No. 2011-523874 dated Jun. 2014.
Office Action from the Japanese Patent Office for Japanese Patent Application No. 2013-523364 dated Jan. 6, 2016.
Office Action From the Japanese Patent Office for Japanese Patent Application No. 2013-555464 dated Jun. 29, 2015.
Office Action from the Korean Patent Office for KR 10-2011-7006179 dated Nov. 26, 2015.
Office Action from the U.S. Patent Office for co-pending U.S. Appl. No. 13/027,423 dated Aug. 15, 2012.
Office Action from the U.S. Patent Office for co-pending U.S. Appl. No. 12/978,974 dated Jan. 24, 2012.
Office Action from the U.S. Patent Office for co-pending U.S. Appl. No. 13/027,423 dated Apr. 13, 2012.
Office Action from the U.S. Patent Office for co-pending U.S. Appl. No. 13/027,423 dated Dec. 13, 2012.
Office Action from the U.S. Patent Office for copending U.S. Appl. No. 12/978,974 dated Aug. 8, 2013.
Office Action from the U.S. Patent Office for copending U.S. Appl. No. 13/027,423 dated Oct. 24, 2011.
Office Action from U.S. Patent Office dated Jun. 5, 2012 for copending U.S. Appl. No. 12/978,974.
PCT International Search Report, PCT/US2009/053676, Productive Research LLC, dated Dec. 23, 2009.

(56) References Cited

OTHER PUBLICATIONS

PCT International Search Report, PCT/US2010/0062138, Productive Research LLC, dated Mar. 18, 2011.
PCT International Search Report, PCT/US2011/024829, Productive Research LLC, dated May 10, 2011.
PCT International Search Report, PCT/US2011/046778, Productive Research LLC, dated Nov. 10, 2011 for co-pending patent application.
PCT International Search Report, PCT/US2012/025619, Productive Research LLC, dated May 29, 2012.
Second Chinese Office Action dated Jan. 15, 2015, Application No. 201180019208.2.
Shelley, Tom, "Steel Makes Lightweight Fibre Sandwich," Sep. 2001. Downloaded from http://fplreflib.findlay.co.uk/articles/1311/n-sandwich.htm on Jun. 3, 2013.
Shinozaki et al. "Spot-Weldable Composite Damping Sheets" Kawasaki Steel Giho. vol. 16 =, No. 4 pp. 288-295, 1984. www.ife-steel.co.jp/archives/ksc_giho/16-4/j16-288-295.pdf.
Sokolova, O. et al, "Metal-polymer-metal sandwiches with local metal reinforcements: A study on formability by deep drawing and bending," Composite Structures, 94 (2011) 1-7.
Weber, Mark and Musa R. Kamal, Polymer Composites, "Estimation of the Volume Resistivity of Electrically Conductive Composites"; Dated Dec. 1997, pp. 711-725.
Weiss et al. "The Influence on Temperature on the Forming Behavior of Metal/Polymer Laminates in Sheet Metal Forming", Transactions of the ASME, 129 ( 2007) 530-537.
Weiss, M. et al., "Elastic Bending of Steel-Polymer-Steel Laminates (SPS) to a Constant Curvature," Journal of Applied Mechanics (ASME), 2006. 73 (4): p. 574-579.
www.quietsteel.com/pressrelease-022003.html. MSC Engineered Materials and Solutions Group, "Quiet Steel™ Debuts on 2003 Cadillac (Feb. 20, 2003)".
Korean Office Action, Application No. KR 10-2012-7024035, dated Jul. 20, 2017.
Canadian Office Action, Application No. CA 2,842,609 dated Jul. 14, 2017.
India Examination Report, Application No. IN 923/DELNP/2011 dated Apr. 24, 2017.
Office Action from the European Patent Office for Europe Patent Application No. 09791472.5 dated Mar. 30, 2017.
Office Action from the Japanese Patent Office for Patent Application No. 2016-046176 dated Mar. 23, 2017.
Office Action from the Japanese Patent Office for Patent Application No. 2015-231058 dated Apr. 3, 2017.
European Communication Pursuant to Article 94(3) EPC, Application No. 09791472.5 dated May 11, 2016.
Japanese Office Action, Application No. 2014-180601, dated Oct. 5, 2015.
Japanese Second Office Action, Application No. 2014-180601, dated Jul. 4, 2016.
Canadian Second Office Action, Application No. 2,734,738 dated Nov. 29, 2016.
Chinese Office Action, Application No. 201510237366.5 dated Oct. 8, 2016.
Korean Final Office Action, Application No. 10-2011-7006179 dated Sep. 30, 2016.
Office Action from the Korean Intellectual Property Office, Applications No. 10-2012-7019948, dated Oct. 20, 2016.
Office Action from the Canadian Intellectual Property Office, Application No. 2,822,748, dated Feb. 8, 2017.
Office Action, for Copending U.S. Appl. No. 13/027,423 dated Nov. 6, 2014.
Office Action from the China State Intellectual Property Office for China Patent Application No. 201510501298.5 dated Oct. 31, 2016.
Office Action from the Japan Patent Office for Japan Application No. 2015-231058 dated Sep. 29, 2016.
Office Action from the Canadian State Intellectual Property Office for Canada Patent Application No. 2,827,457 dated Jan. 9, 2017.
Qingshan, Li chief Editor, The Chinese Textile Press, p. 86, Jan. 2009.
Final Decision of Rejection, Application No. 2013-523364, dated Dec. 27, 2016.
Office Action from the European Patent Office for Europe Patent Application No. 11748818.9 dated Nov. 21, 2016.

FORMABLE LIGHT WEIGHT COMPOSITES

CLAIM OF BENEFIT OF FILING DATE

This application is a continuation of U.S. patent application Ser. No. 13/939,666 filed on Jul. 11, 2013, which is a continuation of U.S. patent application Ser. No. 13/052,292, filed on Mar. 21, 2011 (patent issued on Sep. 24, 2013 as U.S. Pat. No. 8,540,842 B2), which is a continuation of U.S. patent application Ser. No. 12/540,771, filed on Aug. 13, 2009 (patent issued on Apr. 19, 2011 as U.S. Pat. No. 7,927,708 B2), which claims the benefit of U.S. Provisional Patent Application Nos. 61/181,511 filed on May 27, 2009, and 61/089,704 filed on Aug. 18, 2008, the contents of which are all hereby incorporated by reference in their entirety.

FIELD OF THE INVENTION

The present invention relates generally to composite materials, and more particularly to sandwich composites that include a fiber-filled polymeric layer and a metallic layer.

BACKGROUND

Light weight composites which have a good balance of high stiffness, high toughness, and low weight are used in many applications which require low flexibility and can benefit by reduced part weight. Transportation is one industry which has a need for such materials, for example, as a component of a vehicle or for an object (such as a container) which is being transported.

The oil in the late 1970s and early 1980s prompted development of low weight laminates of metal sheets and polymers. Some of the these efforts are reviewed by Kim et al. (Jang-Kyo Kim and Tong-Xi Yu, "Forming and Failure Behavior of Coated, Laminated and Sandwiched Sheet Metal: A Review", J. Mater. Process. Technology 63:33-42, 1997). In their review, Kim et al. describe the use of composites containing steel faces and either nylon 6 or polypropylene cores of thickness of 0.2/0.4/0.2 mm for automotive body panels. This kind of sandwich has exceptional high flexural strength to weight ratio thus leading also to its successful implementation in many engineering applications (Mohr and Strata, 2005). However, specific technical problems must be solved when thin sandwich sheets for the automotive industry are concerned. These problems are related to what is required to adapt such sandwiches to mass production, especially low cost forming processes, such as the already existing stamping processes (and particularly using existing stamping equipment). The ability to use standard stamping lines will reduce capital costs, increase versatility of existing equipment, reduce transition and implementation times, and circumvent major difficulties related to unconventional sandwich-specific manufacturing techniques.

As far as the development of very thin sandwich sheets is concerned, two major approaches have been pursued. The first approach is a group of all metal sandwiches of thin metal skins and a metallic cellular core. Generally, this group can be welded similarly to a typical weldable metal sheet, since it tends to conduct electricity. The second approach, however, typically has two faces of thin metal sheets, separated by a central polymer core layer (which typically are relatively soft viscoelastic materials), and is structured so that it does not conduct electricity across the core layer largely due to the insulative and non-conductive nature of the polymer core layer. The polymeric material in any core of this structure may in fact be an insulator. Thus such sandwich sheet may not be joined by spot welding or require welding conditions (e.g., force, current, cycles, weld time) that may be substantially greater than required for sheet metal having the same thickness. When weldability is concerned, the all metallic sandwich is, therefore, preferred.

Gissinger et al. (1994, U.S. Pat. No. 5,347,099) discloses a method using a specific arrangement of rollers and partially overlapping sandwich sheets as a possible approach to facilitate welding.

Straza (International Patent Application Publication No. WO2007/0620) discloses a method of manufacturing a metal core sandwich structure of a cellular metal core having a shape selected from a group consisting of: octagons, hexagons, pentagons, squares, rectangles, triangles, and circles. Clyne et al. (2004, U.S. Pat. No. 6,764,772) describe a sandwich material of two metal plates which are affixed to and separated by a fibrous metal core that is generally exposed to air, wherein substantially all of, the fibers are inclined at an acute angle to the plates. However, one possible difficulty with those specific cellular metal cores is that the structure is not continuous and thus the face sheet is not supported over the length of the cell. In case of soft face sheets, the thin cell walls may be damaged locally. Their applications thus tend to be limited. It is also a costly structure in that it generally requires the use of expensive materials for resisting corrosion.

Typically, the formability of some metal composites has been found to be inferior to corresponding homogeneous sheet metal of the same thickness. The composites have limited drawing ratios and a higher tendency to wrinkle as well as several potential geometrical defects in bending. For some materials, these defects may be the result of large shear deformations in the interlayer because the core material is wean compared to the sleet metal. Another possible vulnerability of many composites (e.g., sandwiches or laminates), may be their susceptibility to dents. Wrinkling may be attributed to low yield strength of the core material.

Kim et al. (2003) tested the formability of a certain Aluminum/Polypropylene/Aluminum sandwich sheets as possible material for automotive usage. Their analysis suggested that certain polypropylene cores may result in sandwich sheets having improved formability.

Efforts in the art to modify polymeric cores of sandwich composites by introducing a fibrous phase generally have produced the effect of restricting the elongation and thus decreasing the ductility of the composite material. Accordingly, materials have not been given considerable attention for a stampable composite.

Efforts in the art to enhance welding of sandwich composites generally have been directed at modifying polymeric cores of the sandwich composites by loading them with relatively large amounts of conductive particle fillers.

Thus, there still exists a need for light weight composite materials which have improved formability over the existing materials. As such, there is a need for sandwich sheets or laminates which have improved ductility so that low-cost standard sheet metal forming technology could be employed.

Also, there continues to exist a need for a weldable light weight composite having a polymeric layer that does not impede weldability. The ability to join a composite part to other metal containing parts, in particular by welding (e.g., by a resistance welding technique, such as spot welding) is highly desirable.

Additionally, there is a need for light weight composites that can be processed to form an outer covering layer (e.g., to form one or both of a decorative covering, or functional covering, such as a functional coating to improve bonding of the surface to another material such as an adhesive).

SUMMARY OF THE INVENTION

One or more of the above needs may be met with a light weight composite comprising a first metallic layer; a polymeric layer disposed on the first layer; and a metallic fiber distributed within the polymeric layer; wherein the polymeric layer includes a polymeric material containing a polymer, the polymer having an elongation at failure of at least about 20% at a tensile strain rate of about $0.1 \text{ s}^{-1}$ as measured according to ASTM D638-08; so that the resulting composite material may be welded (e.g., by an art disclosed resistance welding method), plastically deformed at strain rates greater than about $0.1 \text{ s}^{-1}$ (e.g., so that it can be stamped by an art disclosed metal stamping operation without rupture, delamination, and/or splitting), or both. More preferably, the polymeric layer is sandwiched between the first metallic layer and a second metallic layer.

This aspect of the invention may be further characterized by one or combination of the following features: the polymer includes a thermoplastic polymer having a glass transition temperature, $T_g$, greater than about 80° C., or a melting temperature, $T_m$ greater than about 80° C.; the volume ratio of the polymer (e.g., the thermoplastic polymer) to the metallic fiber is greater than about 2.2:1 (preferably greater n about 2.5:1, and more preferably greater than about 3:1); the composite comprises a second metallic layer, such that the polymeric layer is a core layer interposed between the first metallic layer and the second metallic layer; the thermoplastic polymer includes a polymer selected from the group consisting of polypropylene, acetal copolymers, polyamides, polyamide copolymers, polyimides, polyester, polycarbonates, ABS polymer (acrylonitrile/butadiene/styrene copolymer), polystyrenes, ethylene copolymers including at least 80 wt % ethylene, and any blend or combination thereof; the thermoplastic polymer comprises a polymer having a crystallinity from about 20% to about 80%; the filled thermoplastic polymer is characterized by an extrapolated yield stress, Y, and a strain hardening modulus, G, measured at a strain rate of $0.1 \text{ s}^{-1}$, wherein the ratio Y/G is less than about 9 (e.g., less than about 3); the filled thermoplastic polymer is characterized by a strain hardening modulus, G, which is greater than about 1 MPa; the filled thermoplastic polymer is characterized by an extrapolated yield stress, Y, which is less than about 120 MPa, a tensile modulus greater than about 760 MPa, a tensile strength of at least about 25 MPa, or any combination thereof; the thermoplastic polymer comprises an elastomer modified polymer; the thermoplastic polymer is substantially free of any plasticizer; the metallic fiber is uniformly distributed within the polymeric layer; the metallic fiber is selectively located within the polymeric layer; the metallic fibers are characterized by a weight average length greater than about 1 mm; the metallic fibers are characterized by a weight average diameter from about 1.0 μm to about 60 μm; the filler further comprises a metallic particle having a weight average particle size less than about 0.10 mm; the filler further comprises a filler particle selected from a carbon black, graphite, iron phosphide or a combination thereof, and the filler particle is present at a concentration less than about 5 volume %, based on the total volume of the core layer; the metallic fiber is selected from the group consisting of steel, stainless steel, aluminum, magnesium, titanium, copper, alloys containing at least 40 wt % copper, alloys containing at least 40 wt % iron, alloys containing at least 40 wt % aluminum, alloys containing at least 40 wt % titanium, and any combination thereof; the metallic fiber concentration is less than about 20 volume % based on the total volume of the polymeric layer; the filler includes reclaimed metallic particles or reclaimed metallic fibers which are produced from offal recovered from a stamping operation; the first metallic layer comprises a first metallic material selected from the group consisting of steel, high strength steel, medium strength steel, ultra-high strength steel, titanium, aluminum, and aluminum alloys; the second metallic layer comprises a second metallic material selected from the group consisting of steel, high strength steel, medium strength steel, ultra-high strength steel, titanium, aluminum, and aluminum alloys, wherein the first metallic material and the second metallic material are made of the same metallic material; the second metallic layer comprises a second metallic material selected from the group consisting of steel, high strength steel, medium strength steel, ultra-high strength steel, titanium, aluminum, and aluminum alloys, wherein the first metallic material and the second metallic material are made of different metallic materials; the composite comprises a plurality of metallic layers, a plurality of polymeric layers, or both; the composite comprises a third metallic layer interposed between two polymeric layers, wherein the third metallic layer is perforated; the composite is i) substantially free of epoxy, ii) substantially free of polymeric fibers, iii) substantially free of an adhesive layer interposed between the polymeric layer and the first metallic layer, iv) or any combination of (i) through (iii); the composite includes an adhesive layer interposed between the polymeric layer and the first metallic layer, wherein the adhesive layer includes a metallic fiber, a conductive filler particle selected from the group consisting of metallic, particles, metallic fiber, carbon black, graphite, iron phosphide, or any combination thereof, or both; or the composite is capable of a draw ratio of at least 1.5 in a stamping operation.

Another aspect of the invention is directed at a method for manufacturing a composite material, such as a composite material described above, comprising the step of i) depositing the metallic fiber and the polymer for forming polymeric layer that is bonded on the first metallic layer.

This aspect of the invention may further be characterized by one or any combination of the following features: the polymeric layer is bonded directly to the first metallic layer; the process includes the steps of heat bonding the polymeric layer to the first metallic layer, and applying a pressure to the polymeric layer and the first metallic layer, wherein the heat bonding step includes heating at least a portion of the polymeric layer in contact with the first metallic layer to a temperature greater than $T_{min}$ wherein $T_{min}$ is the higher of the maximum melting temperature (as measured by differential scanning calorimetry at a heating rate of 10° C./min) of the one or more polymers of the filled thermoplastic material and the maximum glass transition temperature of the one or more polymer of the filled thermoplastic material; the process further comprises a step of bonding a second metallic layer to the polymeric layer, such that the polymeric layer forms a core layer interposed between the first and second metallic layers; the process further comprises a step of extruding an admixture including the metallic fibers and the one or more polymers in an extruder at a temperature greater than $T_{min}$; the process includes a step of providing at least some of the metallic fibers to the extruder as a pre-compounded filled polymeric particle that includes metallic fibers formed by a pultrusion step, wherein the pultrusion step includes coating a plurality of strands of metallic fiber with one or more polymers, and chopping the coated strands to form particles of the filled polymeric material containing the metallic fibers, such that the metallic fibers are oriented in the axial direction of the filled polymeric material, wherein the concentration of the metallic fibers is greater than about 1 volume % based on the total volume of the filled polymeric material; the metallic fibers are chopped metallic fibers; the metallic fibers are provided to the one or more openings in, the extruder as chopped fibers; the process includes a step of recycling or reusing the composite material; the first and second metallic layers are provided as rolls of metallic foil and the process is a continuous process including extruding the filled thermoplastic material at a temperature greater than $T_{min}$, contacting the first and second metallic layers to opposing surfaces of the filled thermoplastic material occurs prior to cooling the filled thermoplastic material to a temperature below $T_{min}$; the step of applying pressure includes a step of passing the composite material through at least one set of counter-rotating rollers, such that the thickness of the composite material is reduced by at least 2%; the process includes a step of placing a spacer at least partially between the first and second metallic layers wherein the spacer is a solid at $T_{min}$; a first part of the spacer is interposed between the first and second metallic layers and a second part of the spacer is not interposed between the first and second metallic layers, and the second part of the spacer has a thickness greater than the thickness of the first part of the spacer; the process further includes a step of cleaning the first metallic layer; the core layer includes from about 3 volume % to about 30 volume % metallic fiber based on the total volume of the core layer; the core layer includes from about 5 volume % to about 25 volume % metallic fiber based on the total volume of the core layer; the ratio of the volume of the one or more polymers to the volume of the metallic fibers is greater than about 22:1; the volume of the filled thermoplastic material is at least 90% of the volume of the space between the first and second metallic layers; the composite material has a resistivity in the through-thickness direction of less than about 10,000 Ω·cm as measured by the voltage drop between the two plates using AC modulation; the admixture further comprises reclaimed metallic filler particle; wherein the process includes a step of contacting the offal from a stamping operation with a polymeric material to form the reclaimed metallic filler particles; the reclaimed filler particles have a weight average particle diameter less than about 0.10 mm and have an aspect ratio less than about 10; the offal includes at least one offal layer which is a metallic material and at least one offal layer which contains a thermoplastic material; the process includes a step of coating the first surface of the first metallic layer with a primer containing metallic particles having an aspect ratio less than 10, an adhesive material containing metallic particles having an aspect ratio less than 10, or both; the first surface of the first metallic layer is free of both a primer, an adhesive material, or both; the metallic fibers are randomly arranged in the thermoplastic material (e.g., the ratio of the volume of fibers in the direction in the plane of the care layer having the highest concentration of fibers to the volume of fibers in the perpendicular direction is less than about 3:1, preferably less than about 2:1); the process includes a step of mixing metallic fibers and other filler particles; the process includes a step of chopping strands of metallic fibers to form chopped fibers and feeding the chopped fibers into an extruder, wherein the process is free of a step of placing the chopped fibers in a container; the process further comprises the steps of: adhering a first surface of a second metallic layer to a first surface of a second filled thermoplastic material, contacting a second surface of the filled thermoplastic material that is adhered to the first metallic layer to a second surface of the filled thermoplastic material that is adhered to the second metallic layer, such that the two filled thermoplastic materials are interposed between the first and second metallic layers, and applying pressure to the second surfaces of the filled thermoplastic materials; wherein the second surface of the filled thermoplastic material has a temperature greater than $T_{min}$, such that the two filled thermoplastic materials adhere and form a core layer interposed between the first and second metallic layers; or the process is characterized by $T_{min}$ is greater than about 120° C.

Yet another aspect of the invention is directed at a method of forming a composite part comprising the step of stamping a composite material, such as one described above, to form a part.

This aspect of the invention may be further characterized by one or any combination of the following features: the process further comprising a step of coating at least one exterior surface of the composite material; the composite material is at a temperature less than about 45° C. during the stamping step; the stamping step includes a step of drawing at least one portion of the composite material by a draw ratio greater than about 1.5; the composite part is free of wrinkles, dents, and cracks; the composite part has a class A surface; the process further comprises a step of welding the composite material to at least one additional metal containing material, wherein the welding step is selected from group consisting of resistance welding, laser welding, and electron beam welding; the welding step is a resistance welding step; the welding step uses i) a welding current which is lower than the welding current required to weld a monolithic metal sheet of the same material as the first metallic layer and having the same thickness as the composite material to the additional metal containing material, ii) a number of weld cycles which is lower than the number of weld cycles required to weld a monolithic metal sheet of the same material as the first metallic layer and having the same thickness as the composite material to the additional metal containing material, or iii) both (i) and (ii); or the composite part is used in an automotive part selected from the group consisting of a bumper, a wheel house outer, a fender outer, a hood outer, a front door outer, a rear door outer, a decklid outer, a liftgate outer, a back seat panel, a rear shelf panel, a dash cowall, a rear compartment pan, a part having a tub for storage of a spare tire, a part having a tub for stow and go seating, a roof outer, a floor pan, a body side, or any combination thereof.

In another aspect, the invention is directed at the use a light weight composite materials, such as one described above, in an automotive panel, a truck panel, a bus panel, a container, panel on train car, a panel in a jet, a bicycle tube, a motorcycle panel, a trailer panel, a panel on a recreational vehicle, or a panel on a snowmobile.

In still another aspect, the invention is directed at a weld joint comprising: a first metallic layer having a first metal; ii) a second metallic layer having a second metal wherein the first metallic layer is in welded contact with the second metallic layer, an area the welded contact defining a weld zone, and wherein the first metal and the second metal are the same or different; and a metallic ring at least partially encircling the weld zone, disposed between the first and second metallic layers, and attached to the first, second, or both metallic layers in the well joint, wherein the metallic ring is of a metal that is different from the first metal and the second metal.

DETAILED DESCRIPTION

Figure 1A:
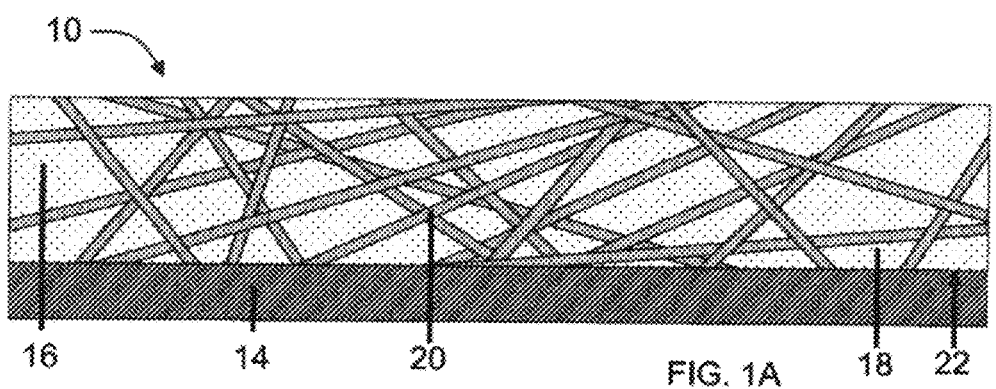
FIG. 1A illustrates a composite material having a polymeric layer and a metallic layer.

In general, the materials herein employ a fill polymeric material, as will be described, and particularly one that includes a metal fiber phase distributed in a polymeric matrix. In general, the composite materials herein employ at least two layers, one of which is the above filled (e.g., fiber-filled) polymeric material (e.g., in a fiber-filled polymeric layer). More particularly, the materials herein are composites that include a sandwich structure, pursuant to which a fiber-filled polymeric layer is sandwiched between two or more other layers. The materials herein also contemplate sandwich structure pre-cursors, e.g., a first layer upon which a filled polymeric layer is attached so that the filled polymeric layer has an exposed outer surface. A second layer may subsequently be attached to the filled polymeric layer. The invention also contemplates feedstock compositions (e.g., in the form of a pellet, a sheet, or otherwise) that include a fiber-filled polymeric material in accordance with the present teachings. As will be illustrated, the materials herein exhibit a unique, surprising, and attractive combination of properties, which render the materials suitable for deforming operations (e.g., relatively high strain rate forming operations, such as stamping), welding operations, or both. For instance, as will be seen from the teachings, the filled polymeric layer is designed in a manner such that is multiphasic. At least one phase (e.g., the filler) provides a conductive flow path, and is such that it is plastically deformable, and may even strain harden when subjected to a stress that induces plastic deformation. In addition, the polymeric phase is such that it bonds sufficiently to another material (e.g., a metal layer such as a steel sheet) that processing of the composite materials for welding and/or deforming (e.g., forming, such as by stamping), will be free of delamination of the composite. The polymeric phase may also be such that it withstands degradation when subjected to coating operations (e.g., when subjected to chemical baths such as electrostatic coating baths, or other baths for imparting corrosion resistance, common in sheet metal coating operations).

The present invention in its various aspects makes use of unique combinations of materials to derive an attractive composite, and particularly a laminate composite. The laminate may be drawn (e.g., deep drawn), welded, or both, in a manner similar to conventional art-disclosed sheet materials, such as sheet metal (e.g., stainless and/or low carbon steel).

In general, the invention makes use of a multi-phase composite material in which the materials are selected and employed so that, as a whole, they impart drawability, weldability, or both. Additionally, the materials are such that the resulting laminates can be processed in a manner similar to conventional art-disclosed thin wailed structures particularly as it relates to processes for imparting a decorative or functional surface treatment (e.g., a coating, a plating, or otherwise).

For example, a particular preferred combination of materials herein may include two layers that flank a core material, the latter of which is preferably a filled polymeric material. The filled polymeric material preferably includes at least one polymer, which polymer may include, consist essentially of, or consist entirely of a thermoplastic polymer, or otherwise has characteristics that render it generally processable as a thermoplastic polymer. The filled polymeric material preferably also includes a filler phase, and preferably a phase having a filler that includes, consists essentially of, or consists entirely of a fiber phase, and particularly an elongated fiber phase, such as an elongated metal fiber phase. Such phase may be sufficiently positioned and/or distributed (e.g., wrapped, braided, aligned, entangled, or any combination thereof), used in sufficient volume that an electrically conductive network across at least portions the filled polymeric material is realized even if the polymer itself generally is not conductive. A particularly preferred elongated fibrous phase may also itself exhibit elongation (either or both individual fibers or the mass as a whole) and possibly strain hardening.

It should be appreciated that references to "layers" herein do not necessarily require discrete and separate pieces of material. For example, a layered composite may still be within the teachings herein if it includes a single sheet of a material that has been folded over upon itself to define two layers of the material, albeit sharing a common edge, between which is located the filled polymeric material.

Turning now with more particularity to the teachings herein, it is seen that in a first aspect there is contemplated a composite material that is made from layers of adjoining dissimilar materials, which includes at least one layer (e.g., a metal layer such as a metal face layer) and at least one polymeric layer, the composite being formable (e.g., stampable by application of a stress to cause plastic strain (e.g., at a relatively rapid rate) of the material or otherwise capable of being cold-formed on a press machine) into a formed panel. The composite material may be a composite laminate containing one metallic layer and one polymeric layer, or it may include one or more other layers. For example, it may be a laminate including one metallic layer interposed between two polymeric layers, or a laminate including a polymeric layer sandwiched between at least two opposing metallic layers. As indicated, a particularly preferred approach envisions this latter structure, the former structures possibly serving as precursors for the later structure. In such instance the method of forming a sandwich structure may include a step of applying a layer to a precursor to form a sandwich structure, a step of applying a first precursor to a second precursor to form a sandwich structure, or both.

Figure 1B:
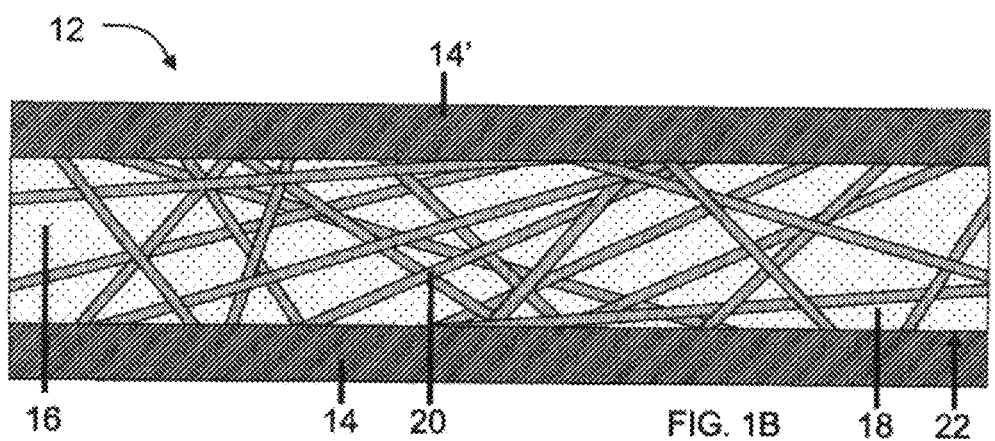
FIG. 1B illustrates a composite material having a polymeric core layer interposed between two metallic layers.

An example of a composite laminate 10 having one metallic layer 14 and one polymeric layer 16 is illustrated in FIG. 1A. A sandwich 12 may contain a first metallic layer 14, a second metallic layer 14' and a polymeric layer 16 (e.g., a polymeric core layer) interposed between the first and second metallic layers, as illustrated in FIG. 1B. Referring to FIGS. 1A and 1B, the polymeric layer 16 includes at least one polymer (e.g., a thermoplastic polymer) 18 and a fiber 20. The polymeric layer 16 and the first metallic layer 14 may have a common surface 22. As illustrated in FIGS. 1A and 1B some or all of the fibers may have a length and orientation such that they extend from one surface of the polymeric layer to the opposing surface of the polymeric layer. However, it will be appreciated that other fiber lengths and orientations are within the scope of the inventions. For example, the fraction of the metallic fibers that extend between the two opposing faces of the polymeric layer may be less than 20%, less than 10%, less than 5%, or less than 1%.

As mentioned, in addition to the composite, multi-layered structures, another aspect of the invention contemplates a precursor polymeric layer sheet material a single layer of the polymeric layer) including the thermoplastic polymer and the fiber (e.g., metallic fiber), that can be later sandwiched between two metallic layers.

Yet another aspect of the invention contemplates a precursor polymeric feedstock material containing the polymer and the fibers. Such a polymeric feedstock material may be formed (e.g., molded or extruded) into the polymeric layer (e.g., into a sheet) either as a single material or by diluting with one or more additional materials (e.g., one or more additional polymers). As such, the precursor polymeric feedstock material may include some or all of the components in the polymeric layer of the composite material. Preferably, the precursor polymeric feedstock material includes substantially all of the fiber for the polymeric layer.

In use, the composites may be deformed (e.g., formed, such as by stamping), attached to another structure (e.g., to steel or to another composite material), or both. A preferred approach is to employ a step of welding the composite of the invention to the other structure. The formed panel may be joined to other parts, when necessary, by techniques other than welding, such as by using adhesives, a brazing process, or the like. In both cases, the composite material (e.g., the laminate or sandwich sheet) is formable by low-cost stamping methods and yet is surprisingly free of the limitations that have been faced previously in the art. The unique features of the composite material render it an extremely attractive candidate for applications which traditionally utilize a regular monolithic metal sheet, such as in the body panels currently employed in the transportation automotive) industry.

One unique feature of the invention is that it includes specific selection of the polymer (e.g., thermoplastic polymer) and the metal fibers, and incorporation of metal fibers and optional particles, as well as other fillers, into the polymeric matrix to produce a novel formable composite material (e.g. sandwich or laminate structure) for low-cost stamping operation. Another novelty is that the stampable sandwiches can be joined by conventional welding techniques such as resistance welding (e.g., spot welding, seam welding, flash welding, projection welding, or upset welding), energy beam welding (e.g., laser beam, electron beam, or laser hybrid welding), gas welding (e.g., oxyfuel welding, using a gas such as oxyacetylene), arc welding (e.g., gas metal arc welding, metal inert gas welding, or shielded metal arc welding). Preferred joining techniques include high speed welding techniques such as resistance spot welding and laser welding.

Various features of formable/stampable materials such test methods, test criteria, descriptions of defects, and descriptions of forming processes are described in the following publications, all expressly incorporated herein by reference:

M. Weiss, M. E. Dingle, B. F. Rolfe, and P. D. Hodgson, "The Influence of Temperature on the Forming Behavior of Metal/Polymer Laminates in Sheet Metal Forming", Journal of Engineering Materials and Technology, October 2007, Volume 129, Issue 4, pp. 530-537.

D. Mohr and G. Straza "Development of Formable All-Metal Sandwich Sheets for Automotive Applications", Advanced Engineering Materials, Volume 7 No. 4, 2005, pp. 243-246.

J. K. Kim end T. X. Yu, "Forming And Failure Behaviour Of Coated, Laminated And Sandwiched Sheet Metals: A Review", Journal of Materials Processing Technology, Volume 63, No 1-3, 1997, pp. 33-42.

K. J. Kim, D. Kim, S. H. Choi, K. Chung, K. S. Shin, F. Barlat, K. H. Oh, J. R. Youn, "Formability of AA5182/polypropylene/AA5182 Sandwich Sheet, Journal of Materials Processing Technology, Volume 139, Number 1, 20 Aug. 2003, pp. 1-7.

Trevor William Clyne and Athina Markaki U.S. Pat. No. 6,764,772 (filed Oct. 31, 2001, issued Jul. 20, 2004).

Frank Gissinger and Thierry Gheysens, U.S. Pat. No. 5,347,099, Filed Mar. 4, 1993, Issued Sep. 13, 1994, "Method And Device For The Electric Welding Of Sheets Of Multilayer Structure".

Strata George C P, International Patent Application Publication (PCT): WO2007062061, "Formed Metal Core Sandwich Structure And Method And System For Making Same", Publication date: May 31, 2007.

Haward R. N., Strain Hardening of Thermoplastics, Macromolecules 1993, 26, 5860-5869.

Materials

By way of example, the use of a fibrous filler in the polymeric layer is believed to facilitate composite manufacturing and surprisingly low levels may be employed to achieve the beneficial results herein. Surprisingly, the selection and combination of materials taught herein affords the ability to employ less metal per unit volume than conventional metal structures of like form (e.g., sheet metal) while still exhibiting comparable properties and characteristics. The problem that the skilled artisan might envision in such a combination of materials unexpectedly are avoided, in this regard, some of the behavioral characteristics of the materials that might be predicted are surprisingly avoided, are employed advantageously in the resulting composite, or both The resulting laminates thus render themselves as attractive candidates to be a drop-in substitute for existing materials, for example, they can be employed instead of sheet steel, without the need for significant investment in resources to re-tool or significant alter processing conditions.

Polymeric Layer

The polymeric layer generally may include or even consist essentially of a filled polymer, (e.g., a thermoplastic polymer filled with a reinforcing fiber, such as a metallic fiber).

The filled polymeric material for use in the polymeric layer preferably is one that generally would be characterized as being relatively rigid (i.e., has a relatively high stiffness, e.g., an apparent modulus of rigidity of at least about 200 MPa as measured according to ASTM D1043-02, over a temperature range of about −40° C. to about 50° C.). The rigidity of the material may be sufficiently high so that it can provide support for any layer between which it is disposed, such as the thin and soft face metal sheets (i.e., the metallic layers), the result of which is that the composite material would be capable of substantially supporting its own weight without sagging (e.g., a 10 cm×10 cm sheet of the composite material having a thickness of between about 0.5 and 2 mm, if clamped one cm deep along one edge to form a cantilever having a free end opposing the clamped end would exhibit less than 5 mm deflection by the free end). Thus, the resulting composite will be sufficiently rigid that it helps to resist deformation such as dents at relatively low impact forces, but will also deform generally in a plastic manner (similar to sheet metals) when subjected to crash impact loads. For example, the filled polymeric material may have a modulus of rigidity (as measured according to ASTM D1043-02) greater than isotactic polypropylene, nylon 6, the polymer absent any filler (i.e. the same polymer as the used in the filled polymeric material, but without the metallic fiber and other filler as taught) or any combination. Preferably the modulus of rigidity is at least 110%, more preferably at least 125%, and most preferably at least 150% of the rigidity of the unfilled polymer (i.e. the same polymer as used in the filled polymeric material, but without the metallic fiber and other filler as taught). The filled polymeric material may have a modulus of rigidity greater than about 200 MPa, preferably greater than about 400 MPa, more preferably greater than about 800 MPa, even more preferably greater than about 1500 MPa, and most preferably greater than about 2500 MPa.

Preferably, at least some of the polymer in the filled polymeric material is a thermoplastic but it may be or include a thermoset polymer, particularly a thermoset polymer that is processable as a thermoplastic, but cured. Preferably, at least 50% (more preferably at least 60, 70%, 80%, 90% or even 95%, if not 100%) by weight of the polymer used in the filled polymeric material is a thermoplastic polymer.

The filled polymeric material may be characterized as being a relatively strong polymeric material. For example, the filled polymeric material may have a relatively high tensile strength (as measured according to ASTM D638-08 at a nominal strain rate of about $0.1\ s^{-1}$). The tensile strength of the filled polymeric material may be greater than the tensile strength of the unfilled polymer (i.e. the same polymer as used in the filled polymer, but without the metallic fiber and other filler as taught). Preferably the tensile strength is at least 110%, more preferably at least 125%, and most preferably at least 150% of the tensile strength of the unfilled polymer (i.e. the same polymer as used in the filled polymer, but without the metallic fiber and other filler as taught). The filled polymeric material may have a tensile strength greater than about 10 MPa, preferably greater than about 30 MPa, more preferably greater than about 60 MPa, even more preferably greater than about 90 MPa, and most preferably greater than about 110 MPa.

The filled polymeric material may also be characterized as having a relatively high elongation at break. For example the filled polymeric material may be characterized by a percent elongation at break greater than 50%, preferably greater than 80% and most preferably greater than about 120%, as measured according to ASTM D638-08 at a nominal strain rate of about $0.1\ s^{-1}$.

The filled polymeric material may have high strain hardening properties (e.g., a ratio of Y/G less than about 9, more preferably less than about 3, where Y is the extrapolated yield stress and G is the strain hardening modulus).

The filled polymeric material may have electrical conductivity properties (e.g., the filled polymeric material may be an electrical conductor) such that the composite material may be welded to another structure such as a sheet metal and a conductive path is provided through the filled polymer. The electrical conductivity properties of the polymeric core material may be achieved by employing metallic fibers and optionally metallic or carbon black particles that are dispersed in the polymer in a quantity to have at least a percolation concentration (i.e., a minimum concentration at which a continuous network, or conductive path between the metal faces, is formed). For the teachings herein, examples of preferred percolation concentrations may be between 3-33% in volume (e.g., between 5-33%, between 10-30%, or even between 3-12%) in volume based on the total volume of the filled polymeric material. Of course, higher concentrations may also be used. The composite material may be weldable using art-disclosed weld schedules or with such weld schedules having up to five additional weld cycles and/or an increase in the weld current by less then about 50%, and/or an increase in the weld pressure by less than about 50%. It is unexpectedly found that the composite materials of the present invention may require fewer weld cycles (e.g., at least 25% fewer weld cycles), a lower weld current (e.g., at least 20% lower weld current), or both, to obtain a good weld, compared with the number of weld cycles and weld current required to obtain a good weld from a monolithic metal sheet having the same metal as a metal face on the composite and having the same total thickness. Such welding conditions advantageously allow for more economical weld schedules that are both faster and require less energy.

The filled polymeric material preferably is light weight and has a density (as measured according to ASTM D792-00) at room temperature less than the density of the metal (assuming it is fully densified) of the metallic layer(s). The density of the filled polymeric material is preferably less than 76%, more preferably less than 60%, even preferably less than 40% and most preferably less than 33% of the density of the metal of the metallic layer(s). By way of example, one approach herein envisions that the filled polymeric including metallic fibers such as steal fibers) will have a density of less than about 4 $g/cm^3$, more preferably less than about 3.0 $g/cm^3$, (e.g., the filled polymeric material may have a density in the range of 1.2 to 2.8 $g/cm^3$ or even 1.3 to 2.6 $g/cm^3$)

The filled polymeric material (e.g., the polymer of the filled polymeric material) may additionally include one or more additives, such as antioxidants, stabilizers, lubricants, antiblocking agents, antistatic agents, coupling agents (e.g., for the fillers), foaming agents, pigments, flame retardant additives, and other processing aids known to the polymer compounding art. Suitable flame retardants may include halogen containing flame retardants and halogen free flame retardants. The flame retardant may also include an antimony containing compound, such as antimony oxide. Exemplary flame retardants which may be employed include chlorine containing flame retardants, bromine containing flame retardants, nitrogen containing flame retardant (such as melamine cyanurate), phosphorus containing flame retardants (such as phosphates, organophosphates, salts of phosphinic acids, and organophosphites), condensates of melamine with phosphoric acid or with condensed phosphoric acids (such as melamine phosphate, melam polyphosphate, melon polyphosphate and melem polyphosphate), magnesium hydroxide ($Mg(OH)_2$) aluminium trihydrate ($Al(OH)_3$), and any combination thereof. Halogenated flame retardant compounds which may be used include flame retardants disclosed in U.S. Pat. No. 3,784,509 (Dotson et. al., Jan. 8, 1974, see for example the substituted imides described in column 1, line 59 through column 4, line 64), U.S. Pat. No. 3,888,388 (Dotson et al. Feb. 25, 1974, see for example the halogenated bisimides described in column 1, line 23 through column 3, line 39); U.S. Pat. No. 3,903,109 (Dotson et al. Sep. 2, 1975, see for example the substituted imides described in column 1, line 46 through column 4, line 50); U.S. Pat. No. 3,915,930 (Dotson et al. Oct. 28, 1975, see for example halogenated bisimides described in column 1, line 27 through column 3, line 40); and U.S. Pat. No. 3,953,397 (Dotson et al. Apr. 27, 1976, see for example the reaction products of a brominated imide and a benzoyl chloride described in column 1, line 4 through column 2, line 28), each of which is incorporated by reference in its entirety. If employed, the one or more additives may be present at a concentration less than about 30 wt %, preferably less than about 20 wt. % and more preferably less than about 10 wt. % based on the combined weight of the polymer and additives.

The filled polymeric material may be free of a plasticizer or other relatively low molecular weight materials which may become volatilized (e.g., during a resistance welding process). If employed, the concentration of plasticizer or other relatively low molecular weight materials preferably is less than about 3 wt. %, more preferably less than about 0.5 wt. % and most preferably less than about 0.1 wt. % based on the total weight of the filled polymeric material (e.g., such that the filled polymeric material does not delaminate from a metallic layer).

It is also possible the teachings herein contemplate a step of selecting materials, processing conditions, or both, so that during processing, delamination of the filled polymeric material from the metallic layer is substantially, or entirely avoided (e.g., delamination caused by vapor pressure buildup at an interface between the filled polymeric material and the metallic layer sufficient for causing delamination).

Polymers

With more attention now to particular examples of polymers for use herein, the polymers used for the filled polymeric material preferably include thermoplastic polymers that either have a peak melting temperature (as measured according to ASTM D3418-08) or a glass transition temperature (as measured according to ASTM D34118-08) greater than about 50° C. (preferably greater than about 80° C., even more preferably greater than about 100° C., even more preferably greater than about 120° C., more preferably greater than about 160° C., even more preferably greater than about 180° C., and most preferably greater than about 205° C.). The thermoplastic polymer may have a peak melting temperature, a glass transition temperature, or both that is less than about 300° C., less than about 250° C. less than about 150° C., or even, less than about 100° C. They may be at least partially crystalline at room temperature or substantially entirely glassy at room temperature. Suitable polymers (e.g., suitable thermoplastic polymers) may be characterized by one or any combination of the following tensile properties (measured according to ASTM D638-08 at a nominal strain rate of 0.1 s$^{-1}$); a tensile modulus (e.g., Young's Modulus) greater than about 30 MPa, (e.g., greater than about 750 MPa, or greater than about 950 MPa); an engineering tensile strength (i.e., $\sigma_e$), a true tensile strength (i.e., $\sigma_t$, where $\sigma_t=(1+\epsilon_e)\sigma_e$ where $\epsilon_e$ is the engineering strain), or both, greater than about 8 MPa (e.g. greater than about 25 MPa, greater than about 60 MPa, or even greater than about 80 MPa); or a plastic extension at break of at least about 20% (e.g., at least about 50%, at least about 90%, or even at least about 300%). Unless otherwise specified, the term tensile strength refers to engineering tensile strength.

The polymer may preferably have a strain hardening properties that will be characterized by a curve of tensile stress ($S_t$) and a derivation of the polymer elongation having the form of: ($L^2-1/L$) where L is the extension ratio, namely the ratio between the final and the initial length under tension (Haward R. N., Strain Hardening of Thermoplastics, *Macromolecules* 1993, 26, 5860-5869). The curve is fitted by the equation:

$$S_t=Y+G(L^2-1/L) \quad\quad\quad (\text{Equation 1})$$

where Y is the extrapolated yield stress and G is the strain hardening modulus. Polymers suitable for the filled polymeric material (e.g., a polymeric layer, such as a core layer in a sandwich composite herein) may have a relatively high strain hardening modulus, a relatively low extrapolated yield stress, or both. The strain hardening modulus of the polymer may be greater than about 1 MPa, preferably greater than about 2 MPa, more preferably greater than about 4 MPa, and most preferably greater than about 10 MPa. The extrapolated yield stress may be less than about 120 MPa, preferably less than about 80 MPa, and more preferably less than about 30 MPa. The Y/G ratio preferably may be less than 9, preferably less than 3, and more preferably less than 2.

Examples of thermoplastic polymers which may be suitable for the polymeric layer include polyolefins (e.g. polyethylene and polypropylene), acetal copolymers, polyamides, polyamide copolymers, polyimides, polyesters (e.g., polyethylene tarephthalates and polybutylene terephthalate), polycarbonates, acrylonitrile butadiene styrene copolymers, polystyrenes, ethylene copolymer including at least 80 wt. % ethylene, copolymers including any of these polymers, blends of any of these polymers, or any combination thereof.

Preferable polyolefins include polypropylene homopolymers (e.g., isotactic polypropylene homopolymer), polypropylene copolymers (e.g., random polypropylene copolymers, impact polypropylene copolymer, or other polypropylene copolymer containing isotactic polypropylene), polyethylene homopolymer (e.g., high density polyethylene, or other polyethylene having a density greater than about 0.94 g/cm$^3$), polyethylene copolymers (e.g., including at least about 80 wt. % ethylene), a blend of any of these polymers, or any combination thereof. Polypropylene homopolymers and polypropylene copolymers may be substantially free of atactic polypropylene. If present, the concentration of atactic polypropylene in the polypropylene preferably is less than about 10 wt. %. Suitable polypropylene copolymers and polyethylene copolymers include copolymers that consist essentially of (e.g., at least 98% by weight), or consist entirely of one or more α-olefins. Other polypropylene copolymers and polyethylene copolymers that may be used include copolymers containing one or more comonomers selected from the group consisting acrylates, vinyl acetate, acrylic acids, or any combination thereof. The concentration of the comonomer may be less than about 25 wt. %, preferably less than about 20 wt. %, and more preferably less than about 15 wt. % based on the total weight of the copolymer. Exemplary polyethylene copolymers that may be used include ethylene-co-vinyl acetate (i.e., "EVA", for example containing less than about 20 wt. % vinyl acetate), ethylene-co-methyl acrylate (i.e., EMA), ethylene co-methacrylic acid, or any combination thereof.

Suitable polyamides include reaction products ref a diamine and a diacid, and monadic polyamides. Exemplary polyamides which are formed from a diamine and a diacid may include polyamides (e.g., nylons) containing reaction products of either adipic acid or terephthalic acid with a diamine. Exemplary monadic polyamides include nylon 6, and poly(p-benzamide). Nylons which may be used in the present invention include nylon 3, nylon 4, nylon 5, nylon 6, nylon 6T, nylon 66, nylon 6/66, nylon 6/66/610, nylon 610, nylon 612, nylon 69, nylon 7, nylon 77, nylon 8, nylon 9, nylon 10, nylon 11, nylon 12, and nylon 91. Copolymers containing any of the above mentioned polyamides may also be used. Polyamide copolymers may include a polyether. Polyamide copolymers may be random copolymers, block copolymers, a combination thereof. Polyethers which may be used with a polyamide copolymer may include glycols. Exemplary glycols which may be used include propylene glycol, ethylene glycol, tetramethylene glycol, butylene glycol, or any combination thereof. Polyamide copolymers may include a plurality of polyamides. An exemplary polyamide copolymer that includes a plurality of polyamides is polyamide 6/66 which includes polyamide 6 and polyamide 66. Suitable polyamide 6/66 copolymers may include less than about 50 wt. % polyamide 66 based on the total weight of the polymer.

The thermoplastic polymers are preferably relatively long chain polymers, such that they may have a number average molecular weight greater than about 20,000, preferably greater than about 60,000, and most preferably greater than about 140,000. They may be unplasticized, plasticized, elastomer modified, or free of elastomer. Semi-crystalline polymers may have a degree of crystallinity greater than about 10 wt %, more preferably greater than about 20 wt %, more preferably greater than about 35 wt %, more preferably greater than about 45 wt %, and most preferably greater than about 55 wt %. Semi-crystalline polymers may have a degree of crystallinity less than about 90 wt %, preferably less than about 85 wt %, more preferably less than about 80 wt % and most preferably less than about 68 wt %. Crystallinity of the thermoplastic polymer may be measured using differential scanning calorimetry by measuring the heat of fusion and comparing it to art known heat of fusion for the specific polymer.

The polymer of the filled polymeric material may also contain up to about 10 wt % of a grafted polymer (e.g., a grafted polyolefin such as isotactic polypropylene homopolymer or copolymer) which is grafted with a polar molecule, such as maleic anhydride.

The thermoplastic polymer include a substantially amorphous polymer (e.g., a polymer having crystallinity less than about 10 wt. %, preferably less than about 5 wt. %, and most preferably less than about 1 wt. %, as measured by differential scanning calorimetry at a rate of about 10° C./min). For example, the thermoplastic polymer may include a substantially amorphous polymer having a glass transition temperature greater than 50° C., preferably greater than 120° C., more preferably greater than about 160° C., even more preferably greater than about 180° C., and most preferably greeter than about 205° C., as measured by dynamic mechanical analysis at a rate of about 1 Hz. Exemplary amorphous polymers may include polystyrene containing polymers, polycarbonate containing polymers, acrylonitrile containing polymers, and combinations thereof.

Examples of polystyrene containing polymers may include polystyrene homopolymers, impact modified polystyrenes, polystyrene block copolymers, and polystyrene random copolymers. Polystyrene block copolymers which may be used include block copolymers containing one, two, three, or more polystyrene blocks, and one or more blocks selected from the group consisting of butadiene, isoprene, acrylonitrile, or any combination thereof. The polystyrene block copolymer may be unsaturated, partially saturated, or completely saturated (e.g., the block copolymer may include an unsaturated comonomer, which, after polymerization is further reacted to remove some or all of the double bonds).

Exemplary styrene block copolymers may include styrene-butadiene-styrene (SBS) block copolymers, acrylonitrile-butadiene-styrene (ABS) block copolymers, styrene-isoprene-styrene (SIS) block copolymers, and styrene-acrylonitrile block copolymers (SAN). Blends of styrene containing polymers with other styrene containing copolymers, or with other amorphous polymers may also be used. For example, the polymer of the filled polymeric material may include a blend of a styrene containing polymer selected from the group consisting of ABS, SBS, SIS, SAN, and polystyrene homopolymer with a polycarbonate. A preferred amorphous copolymer is a blend of ABS and polycarbonate. Preferably, the ABS and polycarbonate blend has an elongation at break greater than about 30%.

In lieu of or in addition to any thermoplastic polymer, the polymeric layer may employ an elastomer having one or both of the following properties: a relatively low tensile modulus at 100% elongation (e.g., less than about 3 MPa, preferably less than about 2 MPa), a relatively high tensile elongation at break (e.g., greater than about 110%, preferably greater than about 150%) both measured according to ASTM D638-08 at a nominal strain rate of about 0.1 s$^{-1}$. The elastomer may function to improving the formability composite material, to increase the ductility of the filled polymeric material, or both. The elastomer may be a synthetic elastomer, a natural elastomer, or a combination thereof. Suitable elastomers may include styrene containing elastomer, ethylene containing elastomers, butadiene containing elastomers, natural rubber, polyisoprene, butane containing elastomers, and acrylonitrile containing elastomers. Suitable elastomers include block copolymers, random copolymers, and homopolymers. The elastomer may include polymer molecules that are functionalized with one or more functional groups selected from maleic anhydride, a carboxylic acid, an amine, an alcohol, or an epoxide. A particularly preferred elastomer for rubber toughening nylon is a functionalized EPDM, such as a maleic anhydride grafted EPDM. The elastomer may be cross-linked (e.g., cross-linked beyond the gel point of the elastomer) or substantially free of cross-links. The elastomer may be substantially free of cross-links during a deformation (e.g., stamping) operation, and/or a welding (e.g., resistance welding) operation. The elastomer may include a curative, cure accelerator, or other chemical that will enable the elastomer to crosslink after a deformation operation (e.g., in a bake oven, such as an oven employed for drying a coating on the panel). The elastomer preferably is characterized by a hardness of less than about 87 Shore A, more preferably less than 70 Shore A, and most preferably less than about 50 Shore A, as measured according to ASTM D2240.

Though it is possible that some amounts of epoxy may be used, the polymer of the filled polymeric material preferably is substantially free or entirely free of epoxy, or other brittle polymers (e.g., polymers having an elongation at failure of less than about 20% as measured according to ASTM D838-08 at a nominal strain rate of about 0.1 s$^{-1}$), or both. If present, the concentration of epoxy, other brittle polymers, or both is preferably less than about 20%, more preferably less than about 10%, more preferably less than about 5%, and most preferably less than about 2% by volume, based on the total filled polymeric material.

Polymers useful in the filled polymeric material may have a relatively high coefficient of linear thermal expansion, e.g., above about $80 \times 10^{-6}$.

Fillers

Figure 2:
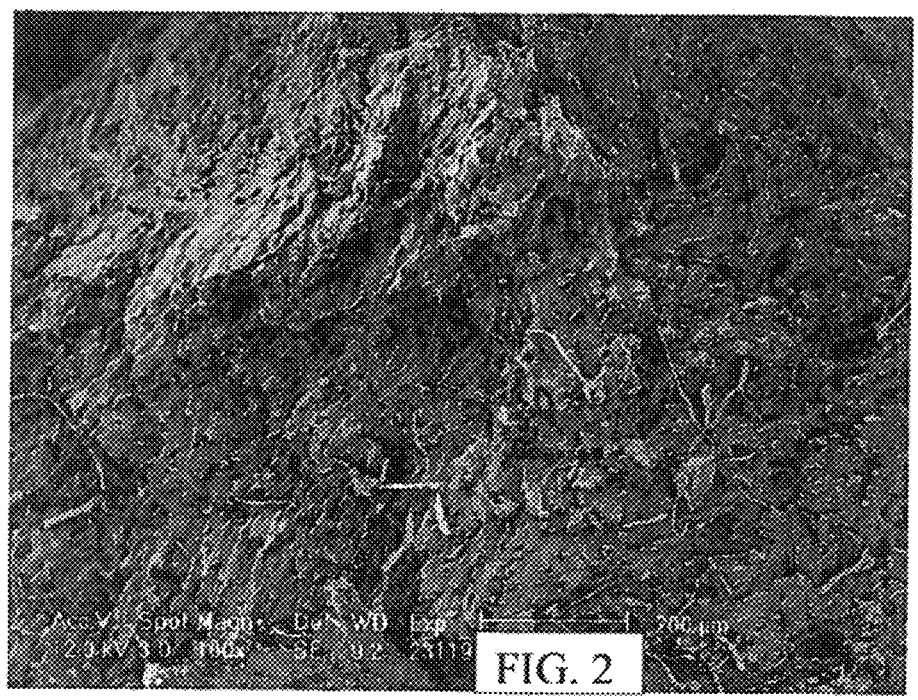
FIG. 2 is an example of one possible microstructure in accordance with the present teachings in which a metallic fiber is distributed in a continuous phase of a polymeric matrix.

The filled polymeric material (e.g., the filled thermoplastic polymeric layer) contains one or more fillers. The fillers may be a reinforcing filler, such as fibers, and more particularly metallic fibers. Fibers may have an aspect ratio of the longest dimension to each perpendicular dimension (e.g., length to diameter) that is greater than about 10, preferably greater than about 20, and most preferably greater than about 50. At least a portion of the fibers (e.g., the longitudinal direction of the metal fibers) may be preferentially oriented or they may be randomly dispersed in the filled polymeric material. For example, the overall general longitudinal direction of at least some of the fibers may be preferentially oriented perpendicular to the transverse direction of any layer of the filled polymeric material, or they may be randomly oriented with respect to the transverse direction of any such layer. The metallic fibers (e.g., the longitudinal direction of the metallic fibers) may be preferentially oriented in one, two, or more direction(s) within the plane of such layer, or they may be randomly oriented within the plane of the layer. The metallic fibers may be uniformly distributed within the filled polymeric material of any layer or they may be selectively located within the filled polymeric material of any layer. FIG. 2 illustrates an example of how fibers may be distributed. FIG. 2 depicts a plurality of fibers oriented in a plurality of directions some of which are entangled with each other and which are attached to polymer.

The filled polymeric material may also contain one or more other fillers, such as a filler particle (e.g., powders, beads, flakes, granules, and the like). As used herein, a filler particle is a filler that is not a fiber (i.e., it is not a filler having an aspect ratio of the longest direction to each perpendicular directions that is greater than about 10). The filler particle preferably has an aspect ratio of the longest direction to a perpendicular direction that is less than about 10, preferably less than about 6, and most preferably less than about 5. For example, the filled polymeric material may contain a filler particle selected from metallic particles, carbon, carbon black (e.g. SRF, GPF, FEF, MAF, HAF, ISAF, SAF, FT and MT), surface-treated carbon black, silica, activated calcium carbonate, light calcium carbonate, heavy calcium carbonate, talc, mica, calcium carbonate, magnesium carbonate, clay, calcium silicate, hydrotalcite, diatomaceous earth, graphite, pumice, ebonite powder, cotton flock, cork powder, barium sulfate, wollastonite, zeolite, sericite, kaolin, pyrophyllite, bentonite, alumina silicate, alumina, silicon oxide, magnesium oxide, zirconium oxide, titanium oxide, iron oxide, iron phosphide, dolomite, calcium sulfate, barium sulfate, magnesium hydroxide, calcium hydroxide and aluminum hydroxide, boron nitride, silicon carbide, glass, and any combination thereof. Exemplary fillers which may be used in the filled polymeric material include metallic particles, carbon black, graphite, nano-clay particles, or any combination thereof. The concentration of particle fillers is preferably less than about 10 volume %, more preferably less than 5 volume %, and most preferably less than 2 volume %, based on the total volume of the filled polymeric material. One or more filler may include a nano tube structures, a layered structures, an intercalated structure, or some other structure.

Exemplary metallic fibers which may be used in the invention include fibers formed from metals such as steel (e.g., low carbon steel, stainless steel, and the like), aluminum, magnesium, titanium, copper, alloys containing at least 40 wt % copper, other alloys containing at least 40 wt % iron, other alloys containing at least 40 wt % aluminum, other alloys containing at least 40 wt % titanium, and any combination thereof. Any of the metals which may be used for the metallic layer(s), as described later, may also be used for the metallic fibers. Some or all of the metal fiber may be of a metal or a metal alloy that is generally corrosion resistant (e.g. stainless steel), or some or all of the metal fiber may be of a metal or metal alloy (e.g., aluminum, magnesium, or both) that offers cathodic protection to the metallic layers and/or to other metallic fibers. The filled polymeric material may include metallic fibers that are of the same material or metallic fibers from a plurality of different materials. For example, some of the metallic fibers may be of a metal or metal alloy that offers cathodic protection. Preferably, the concentration of the fibers of a metal or metal alloy that offers cathodic protection is less than 60 wt. %, more preferably less than 20 wt. %, and most preferably less than about 10 wt. % based on the total weight of the metallic fiber. Mixtures of different metallic fibers may also be used.

The filled polymeric material may contain non-metallic conductive fibers, such as carbon fibers, fibers formed from conductive polymers, and the like. If present, the weight ratio of the non-metallic fibers to the metallic fibers is preferably greater than about 1:10, more preferably greater than about 1:5, and most preferably greater than about 1:3. If present, the weight ratio of the non-metallic fibers to the metallic fibers is preferably than about 10:1, more preferably less than about 5:1, and, moat preferably less than about 3:1. It will be appreciated that filled polymeric material that are capable of being welded may also be prepared using non-metallic conductive fibers in place of the metallic fibers. Conductive polymers which may be used include polymers include poly(acetylene)s, poly(pyrrole)s, poly(thiophene)s, polyanilines, polythiophenes, poly(p-phenylene sulfide), poly(para-phenylene vinylene)s (i.e., PPV), polyindole, polypyrene, polycarbazole, polyazulene, polyazepine, poly (fluorene)s, and polynaphthalene, any blend thereof, any copolymer thereof, or any combination thereof. PPV and its soluble derivatives have emerged as the prototypical electroluminescent semiconducting polymers. Exemplary thiophenes which may be used include alkylthiophene)s (such as poly(3-octylthiophene) and poly(3-(4-octylphenyl)thiophene)), poly(3-(alkylsulfanyl)thiophene)s, polybromothiophenes (such as poly(2-bromo-3-alkylthiophene), poly(2,5-dibromothiophene), and the like), polybithiophenes (such as poly(2,2'-bithiophene)s), or any combination thereof.

The weight average length, $L_{avg}$, of the metallic fibers may be greater than about 0.5 µm, preferably greater than about 5 µm, more preferably greater than about 100 µm, even more preferably greater than about 1 mm, even more preferably greater than about 2 mm, and most preferably greater than about 4 mm. Suitable fibers may have a weight average length of less than about 200 mm, preferably less than about 100 mm, more preferably less than about 55 mm, and most preferably less than about 25 mm. The metallic fibers may also be described by the dispersity of the lengths. For example the metallic fibers may have a relatively narrow dispersity of lengths such that greater than 50% (or even greater than 70%) of the metallic fibers have a length between $0.8*L_{avg}$ and $1.2*L_{avg}$. The metallic fibers may have a relatively broad dispersity such that less than 50% (or even less than 30%) of the metallic fibers have a length between and $1.2*L_{avg}$. The metallic fibers may also be characterized by the weight average diameter of the fibers. The weight average diameter of the fibers may be greater than about 0.01 µm, preferably greater than about 0.1 mm, more preferably greater than about 0.5 µm, even more preferably greater than about 1.0 µm, even more preferably greater than about 3 µm, and most preferably greater then about 12 µm. The weight average diameter of the fiber may be less than about 300 µm, preferably less than about 100

μm, more preferably less than about 50 μm, and most preferably less than about 30 μm.

The concentration of the metallic fiber preferably greater than about 1 volume %, more preferably greater than about 3 volume %, even more preferably greater n about 5 volume %, even more preferably greater than about 7 volume %, even more preferably greater than about 10 volume % and most preferably greater than about 12 volume % based on the total volume of the filled polymeric material. The metallic fibers may be present in the filled polymeric material at a concentration less than about 60 volume %, preferably less than about 50%, more preferably less than about 35 volume %, still more preferably less than about 33 volume %, and most preferably less than about 30 volume % (e.g., less than about 25 volume %, or even less than about 20, 10, or 5 volume %) For example the amount of fiber may be about 1%, 2%, 3%, 4%, 6%, 6%, 7%, 8%, 9%, or 10%, by volume based on the total volume of the filled polymeric material, or within a range bounded by those values (such as from about 1% to about 6%). It is possible that composites herein may employ a concentration of metallic fibers that surprisingly is substantially lower than the amount of a particle filler necessary to achieve similar welding characteristics. Moreover, it is also possible that the fibers and materials are selected so that better welding performance surprisingly may be realized at a relatively low concentration of metallic fibers as compared with an identical composite material having a higher concentration of metallic fibers. For example, it is surprisingly seen that using a filled polymeric material having about 10 volume % metallic fiber results in composite materials having superior welding characteristics compared with those made with filled polymeric materials having higher concentrations of metallic fiber.

The thermoplastic polymer material may be present in the filled polymeric material at a concentration greater than about 40 volume %, preferably greater than about 65 volume %, more preferably greater than about 67 volume %, still more preferably greater than about 70 volume %, and most preferably greater than about 75 volume % (e.g., at least about 80 volume %, at least about 90 volume %, or even at least about 95 volume %).

The volume ratio of the polymer (e.g., the thermoplastic polymer) to the fibers (e.g., the metallic fibers) is preferably greater than about 2.2:1, more preferably greater than about 2.5:1, and most preferably greater than about 3:1. The volume ratio of the polymer (e.g. the thermoplastic polymer) to the fibers (e.g., the metallic fibers) is preferably less than about 99:1, more preferably less than about 33:1, even more preferably less than about 19:1, and most preferably less than about 9:1, (e.g., less than about 7:1).

The material of any core in the sandwich composites herein contain pores or voids, or may be substantially free of pores and voids. Preferably, the concentration of pores and voids in the filled polymeric material is less than about 2 volume %, more preferably less hears about 10 volume %, still more preferably less than about 5 volume %, and most preferably less than about 2 volume % (e.g., less than about 1% by volume), based on the total volume of the filled polymeric material.

The fiber (e.g., the conductive fiber, such as the metallic fiber) preferably is present at a concentration greater than about 40 volume %, more preferably greater than about 70 volume %, and most preferably greater than about 80% (e.g., greater than, about 90 volume %, or even greater than about 95 volume %) based on the to of the filler in filled polymeric material.

The combined volume of the polymer (e.g., thermoplastic polymer) and the metallic fibers is preferably at least about 90% by volume, more preferably at least about 95% by volume and most preferably at least about 98% by volume based on the total volume of the filled polymeric material.

The metallic fibers provide one or any combination of electric conductivity for welding, a reinforcement for strengthening, or strain hardening the polymeric structure by utilizing fibers that as metals are capable of extending and imparting better strain hardening properties to the polymeric core. As such, the tensile elongation (at failure) of the metal fibers is preferably greater than about 5%, more preferably greater than about 30%, and most preferably greater than about 60% as measured according to ASTM A370-03a.

The metallic fibers, the metal particles, or both preferably reduces the melt flow rate of the filled polymeric material. The melt flow rate (as measured according to ASTM D1238, e.g., method K) of the filled polymeric material is preferably at least about 20% less than, more preferably at least about 40% less then, and most preferably at least about 60% less than the melt flow rate of the unfilled (i.e. the same polymer as used in the filled polymeric material, but without the metallic fiber and other filler as taught).

It is possible that the materials herein may employ in combination with fibers, a metallic particle. Metallic particles may be spherical, elongated, or of any shape other than a fiber shape. Each metallic particle may be characterized by a size equivalent to the diameter of a spherical particle having the same volume as the particle. Thus defined, the metallic particles may have an average size less than about 2 mm, preferably less than about 1 mm, more preferably less than about 0.1 mm, and most preferably less than about 0.07 mm (e.g., less than about 0.04 mm).

The fibers (e.g., the metallic fibers) or the combination of the fibers and the metallic particles preferably are dispersed (e.g., randomly dispersed) in the polymeric matrix at a volumetric concentration of less than about 30% (more preferably less than about 25%, and most preferably less than about 20%) by volume of the total polymeric layer). If metallic particles are employed, the ratio of the volume of the fibers (e.g., the metallic fibers) to the volume of the metallic particles in the filled polymeric material layer may be greater than about 1:30, preferably greater than about 1:1, and most preferably greater than about 2:1.

In one aspect of the invention, metallic particles, metallic fibers, or both may be obtained by a step of grinding offal and/or scrap of a stamping operation of a monolithic metal material or of a composite material (e.g. of a sandwiched plates, such as one made according to the teachings of the present invention), a machining operation or other operation that generates particles. This grinding operation may also produce recycled polymeric material which may be melted together with the thermoplastic polymer to produce the polymeric core. In such reclaim steps, a substantial reduction in cost may be achieved.

In addition to the metallic fibers and the metallic particles, carbon in the form of powder, graphite, grapheme, or any combination thereof, may also be added at a concentration preferably less than about 5 volume % based on the total volume of the polymeric layer, which may function, for example, to further increase the electric conductivity.

Nano-clay particles may also be used, which may function, for example, to improve the polymer ductility. When used, the concentration of the nano-clay particles preferably is less than about 5 volume % based on the total volume of the polymeric layer.

Metal Layers

As discussed, it is envisioned that composites herein may employ a sandwich structure by which a mass of a polymeric core is flanked on opposing sides by spaced apart layers. For example, a structure herein may include two sheets that have a metal fiber reinforced polymeric core material disposed between the sheets in contact with the sheets. The metal layers (e.g., the first metallic layer and the second metal layer) of the sandwich construction may be made of a suitable material (e.g., metal) in the form of foils or sheets or other layers having equal or unequal thickness (e.g., average thickness) across the layer. Each metallic layer may have a generally constant thickness or may have a thickness that varies. The face metal on each side may be made of materials having the same or different properties and be made of the same or different metals. If the metal faces are made of metal sheets of unequal thickness, materials having different properties, or materials having different metal. The composite material may have a marking or other means of identifying and distinguishing the different metal faces. The layers may be the same or different in composition, size (e.g., thickness, width, volume, or otherwise), shape, or other features, relative to each other layer.

The metal layers may contain a pure metal or metal alloy containing at least about 40 mole % of one of the following metals: Fe (iron), Ni (nickel), Al (aluminum), Cu (copper), V (vanadium), Cr (chromium), or Ti (titanium). The metal faces may contain an alloy comprising two or more metals selected from the group consisting of Fe, Ni, Al, Cu, V, Ti, Cr, Mo (molybdenum), Mn (manganese), Mg (magnesium), or W (tungsten). Such metals or metal alloys may also contain additional metals or non-metals. For example, suitable metals for the face metal may also contain C (carbon), or Si (silicon) at a concentration less than about 10 mole %. Exemplary materials which may be used for the metallic faces include regular steel, high strength steel, medium strength steel, ultra-high-strength steel, stainless steel, titanium, aluminum and their alloys. The metal or metal alloy may have one or more crystalline phases. For example, the metal alloy (as may any fiber used) may have a crystalline phase selected from the group consisting of hexagonal closed pack, face center cubic, simple cubic, and body center cubic. The metallic layer may contain ferritic steel, austenitic steel, cementite, or any combination thereof. The metallic layer may be annealed, cold hardened, heat treated, precipitation hardened, or otherwise treated. The metallic layer may have relatively large grain size (e.g., greater than about 3 mm), or relatively small grain size (e.g., less 3 mm). The metal faces may have one or more surfaces plated or coated with a thin film. Exemplary coatings and platings may include one or any combination of galvanized, electrogalvanized, chrome plating, nickel plating, corrosion resistance treatment, e-coat, zinc coated, Granocoat, Bonazinc and the like. Preferably, one or both of the metal faces are free of a coating with a material having an electrical resistivity less than about 10 $\Omega \cdot$cm. A combination of different metallic materials may be used by having different kinds of metal faces on opposing sides of the polymeric layer and/or by using tailored blanks that combine different alloys (e.g., different grades of steel) and thicknesses of metals into a single blank. For a laminate containing only ore metal face, the above mentioned metals may be used for they metal face (i.e. for the first metallic layer).

One or both of the metal faces preferably may be relatively thick, such that the metal face does not wrinkle, tear, or form other defects when preparing and/or processing the composite material. Preferably, the thickness of one or both of the metal faces is at least about 0.05 mm, more preferably at least about 0.10 mm, even more preferably at least about 0.15 mm, and most preferably at least about 0.18 mm. The sheets may have a thickness less than about 3 mm, preferably less than about 1.6 mm, and more preferably less than about 1 mm, and most preferably less than about 0.5 mm. For example, the composite material may be used in an automotive panel requiring at least one class A or class B surface, preferably at least one class A surface. Such a composite material may have a first surface which is a class A surface and a second surface which is not a class A surface. The class A surface may have a first metal face having a relatively high thickness and a second surface that has a second metal face having a relatively low thickness (e.g., at least about 20% or even at least about 40% less than the thickness of the first metal face). In general, the ratio of the thickness (e.g., average thickness) of the first metal layer to the thickness of the second metal layer may be from about 0.2 to about 5, preferably from about 0.5 to about 2.0, more preferably from about 0.75 to about 1.33 and most preferably from about 0.91 to about 1.1.

Composite Material

The composite material may be in the form of a multi-layered sheet, e.g., sandwich structure including sheets of a material such as a metal that sandwich a core of the fitted polymeric material. The sheets may have a total average thickness less than about 30 mm, preferably less than about 10 mm, more preferably less than about 4 mm and most preferably less than about about 2 mm; and preferably greater than about 0.1 mm, more preferably greater than about 0.3 mm, and most preferably greater than about 0.7 mm). The composite material may have a generally uniform thickness or the composite material may have a thickness that varies (e.g., a random or periodic variation in one or more directions). For example, the variation in the thickness may be such that the standard deviation of the thickness is less than about 10% of the average thickness. The standard deviation of the thickness is preferably less than about 5% of the average thickness, more preferably less than about 2% of the average thickness, and most preferably less than about 1% of the average thickness.

The thickness of the filled polymeric layer may be greater than about 10%, 20% 30%, 40%, or more of the total thickness of the composite material. The volume of the filled polymeric layer may be greater than about 10%, 20%, 30%, 40%, or more of the total volume of the composite material. Preferably, greater than 50% of the volume of the composite material will be the filled polymeric material. The concentration of the filled polymeric material is more preferably greater than about 60 volume % and more preferably greater than about 70 volume % based on the total volume of the composite material. The concentration of the filled polymeric material is typically less than 92 volume % based on the total volume of the composite material; however, higher concentrations may be used, particularly in relatively thick composites (e.g., having a thickness greater than about 1.5 mm).

The total thickness of outer layers of a sandwich composite structure herein (e.g., metallic layers) may be less than about 70% of the total thickness of the composite material. The total thickness of metallic layers preferably is less than about 50%, more preferably less than about 40% and most preferably less than about 30% of the total thickness of the composite material. The total thickness of the outer layers (e.g., the metallic layers) may be greater than about 5%, preferably greater than about 10%, and more preferably greater than about 20% of the total thickness of thickness of the composite material.

The polymeric core layer preferably is in contact (direct or indirect, such as via a primer and/or adhesive layer) with at least a portion of the surface of the adjoining layers (e.g., one or more metallic layer) facing the core layer. Preferably, the area of contact is at least about 30%, more preferably at least about 50%, most preferably at least about 70% of the total area of the surface of the adjoining layer facing the polymeric core layer.

The composite material may include a plurality of polymeric core layers. For example, the composite material may include one or more core layers which includes an adhesive such that it adheres to a metallic layer, a different core layer, or both.

The composite material may have a relatively high stiffness (e.g., flexural stiffness (i.e., apparent bending modulus) as measured at about 20° C. according to ASTM D747) to density ratio. For example, the composite material containing at least 30 volume % of core material and having a thickness, t, may have a stiffness to density ratio which is greater than the stiffness to density ratio of a sheet made of the same material (e.g., metal) as the face material (e.g., metals), and having the same thickness t. The stiffness to density ratio of the composite material may exceed the stiffness to density ratio of a sheet of the face material (e.g., metal) having the same thickness by greater than about 5%, preferably greater than about 10%, more preferably greater than about 14%, and most preferably greater than about 18%.

The layers adjoining the filled polymeric material (e.g., metallic layers) typically have a relatively low coefficient of linear thermal expansion. For example, the ratio of the coefficients of linear thermal expansion of a metallic layer to the thermoplastic polymer may be from about 1:30 to about 1:3, more preferably from about 1:15 to about 1:5. The composite material surprisingly does not delaminate or otherwise fail after cycling between extreme ambient temperatures (e.g., between −40° C. and +40° C.) despite the large difference in the coefficients of linear thermal expansion between the polymer phase and the adjoining materials (e.g., the metallic face material). Without being bound by theory, it is believed that the relatively low coefficient of thermal expansion of the metallic fibers reduces the coefficient of linear thermal expansion of the filled polymeric material so that delamination is reduced or even eliminated.

Process for Preparing the Composite

The composite material may be prepared using a process that results in the filled polymeric material (e.g., core layer) being bonded to at least one adjoining layer (e.g., a metallic sheet) and preferably being interposed between two layers (e.g., two metallic layers) and bonded to one or both layers. The process may include one or any combination of steps of heating, cooling, deforming (e.g., forming, such as by stamping), or bonding, in order to arrive at a final desired article. It is envisioned that at least one, or even all of the adjoining layers (e.g., metallic layers) may be provided in the form of a rolled sheet, a forging, a casting, a formed structure, an extruded layer, a sintered layer, or any combination thereof.

The sheets may be heated to a temperature greater than about 90° C. (e.g. greater than about 130° C., or greater than about 180° C.). Preferably, the sheets are heated to a temperature greater than about $T_{min}$, where $T_{min}$ is the highest glass transition temperature ($T_g$) and melting temperature ($T_m$) of the filled polymeric material. The metallic sheets, the filled polymeric material, or both may be heated to a maximum temperature above which the polymer (e.g., the thermoplastic polymer) may undergo significant degradation. The thermoplastic polymer may be heated to a temperature preferably less than about 350° C., more preferably less than about 300° C. The heated polymer may be mixed with the metallic fiber, and with any additional fillers. The heated polymer (e.g., thermoplastic polymer) may be extruded as a sheet layer. The sheet layer may be extruded directly between the metal faces, or placed between the metal faces later in the process or in a separate step.

The polymeric core layer may be a homogeneous layer or may comprise a plurality of sublayers. For example, the filled polymeric material may contain an adhesive layer (e.g., on one mere surfaces). If employed, the adhesive layer or layers preferably include metallic fibers, conductive filler particles (e.g., a conductive filler particle selected from the group consisting of metallic particles, carbon black, graphite, iron phosphide, and combinations thereof), or both. Such an adhesive layer may be selected and applied to provide sufficiently good adhesion (e.g., a cohesive failure mode is observed when peeling the metal layer from the polymeric layer) to the metal face, the polymeric core, or both. It is also contemplated that some of the fibers from the polymeric core may protrude or penetrate into the adhesive (e.g., into the adhesive layer). An adhesive layer may include a conductive fiber (e.g., the adhesive layer may be a fiber-filled polymeric layer that includes metallic fiber). The composite material may be free of any adhesive and/or adhesive layer.

The process for fabricating the composite material may also include one or more steps of heating one or more metal layers, applying pressure to the layers, calendaring a polymer (e.g., a thermoplastic polymer or the thermoplastic polymer compounded with the metallic fiber and the optional fillers), and annealing the composite sheet (e.g., at a temperature greater than the melting temperature of any thermoplastic polymer in the material).

The process for preparing the filled polymeric material (e.g., a core layer for the sandwich composites herein) may include a step of contacting the fiber and the polymer (e.g., thermoplastic polymer). The step of contacting the fiber and the polymer may occur prior to, or during a step of forming the filled polymeric material. For example, a precursor feedstock filled polymeric material including the fiber and at least a portion of the polymer may be prepared by a pultrusion process including a step of pultruding a single fiber or preferably a plurality of fibers through a polymer in a liquid state (e.g., a molten thermoplastic polymer), such that the fibers are coated with the polymer. The process of preparing a precursor feedstock polymer material preferably employs continuous fibers and the feedstock material is preferably chopped into, pellets, granules, rods, or other shape (each typically having a mass of less than about 2 grams) suitable for feeding into a polymer extruder or other polymer processing equipment. As such, the fibers in each pellet, granule, or rod, will aligned in a generally axially orientation. As another example, a precursor feedstock filled polymeric material may be prepared by blending the fibers and at least a portion of the polymer (e.g., the thermoplastic polymer) in an extruder, internal mixer, mill, or other polymer mixing equipment, at a temperature at which the polymer flows. In another approach, the fiber and the polymer are contacted during the process of preparing the polymeric layer. For example, fiber and polymer (e.g., thermoplastic polymer) materials may be dry blended and fed into a polymer processing equipment, they may be fed individually but at the same time and location into the polymer processing equipment, or they may be fed into different locations or at different times into the polymer processing equipment. The process of forming a precursor feedstock filled polymeric material or of forming the polymeric layer may include a step of chopping the fibers and feeding them directly into the polymer processing equipment (such a process may be free of a step of storing the chopped fibers, or include a step of contacting the fibers with a partitioning agent (e.g., a powder such as a powder filler or a powder polymer)). The process of forming the polymeric layer may be a continuous process or a batch process. Preferably, the process is a continuous process.

The process may include a step of providing a third metal layer (in addition to the first and second metal layer). It may include a step of interposing a second polymeric core layer between the second metal layer and the third metal layer, such that the second metal layer is interposed between the two polymeric layers. When employed, the third metallic layer preferably may be perforated (e.g., having a plurality of openings covering at least about 20%, more preferably at least about 40%, and most preferably at least about 60% of the surface of the third metallic layer).

The process may include a step of contacting a filled polymeric material surface of a laminate with the surface of either a second metallic layer or a filled polymeric material of a second laminate at a temperature greater than $T_{min}$, where $T_{min}$ is the greater of the highest melting temperature or the highest glass transition temperature of polymer in the filled polymeric material, such that the contacting surfaces at least partially bond and forms a composite having a filled polymeric material layer interposed between two metallic layers. The process may also contain a step of applying pressure to the first and second metal layer, e.g., by feeding the composite material through one or more pairs of rollers having a predetermined spacing. The step of applying pressure preferably occurs when at least some of the polymer of the filled polymeric material (e.g., the thermoplastic in contact with the metal layer) is above $T_{min}$. For example, the step of applying pressure may occur when at least some of the polymer of the filled polymeric material is at a temperature greater than about 80° C., preferably greater than about 120° C., more preferably greater than about 180° C., even more preferably greater than about 210° C., and most preferably greater than about 230° C. The process may also include a step of cooling the composite material (e.g. to a temperature below $T_{min}$, preferably below the melting temperature of polymer of the filled polymeric material, and more preferably below about 50° C.).

The process may also include a step of applying one or more spacers for separating opposing layers and in the space into which the filled polymeric material is introduced (e.g., between first and second metal layers). Structures herein thus also contemplate inclusion of one or more spacers between the layers. For example, a spacer may be entirely interposed between two opposing layers, or the spacer may have a first section that is interposed between two opposing layers and a second section (which may have a larger thickness than the first section) that is not interposed between the layers. The spacer may be a rod, a bead, a member having a profile (e.g., a profile having a generally uniform cross-section), a deformation deliberately formed into a metal layer, or any combination thereof.

The composite material may be a laminate, which preferably has a uniform thickness. The variation in the thickness of the laminate may be the same as for the sheet as described above. The process for manufacturing the laminate may be similar to the process for manufacturing the sheet, except that only one metal sheet is utilized.

It may be preferable for the process for manufacturing the composite material to be free of a step of heating the composite material to a temperature at which the metallic fibers may sinter or otherwise fuse directly together (e.g., in a metallurgical bond), to a temperature at which the metallic fibers undergo a phase transition, to a temperature at which internal stresses in the metallic fibers are relieved (e.g., following an operation of stamping the composite), or any combination thereof.

In lieu of, or in addition to fibers, the process of preparing the core filled polymeric material layer may employ a printing ((e.g., an inkjet printing) lithography (e.g., photolithography) process to deposit a plurality of layers including metal to build a 3-dimensional electrically conductive metallic network. Such a metallic network may be present in any of the concentration ranges described herein for the fibers.

In yet another approach, the filled polymeric layer may be formed by contacting the fibers with one or more monomers or prepolymers, followed by a step of polymerizing the one or more monomers or prepolymers. The polymerization may occur in a processing equipment (e.g., in an extruder), on a form, or in a mold; on a metallic layer, between two metallic layers, or the like.

The teachings herein generally contemplate sandwich structures that are open at their edges. However, the process may include a step of treating the edge of the composite material to seal the edge. One or more edges of the composite material may be sealed by a mechanical operation (e.g., crimping or bending of the composite material) by a cover (e.g., a coating, a lamination, or an attached cover), or by a welding, soldering, or brazing operation.

Forming Process

The composite material of the present invention may be subjected to a suitable forming process, such as a process that plastically deforms a material and may include a step of stamping, roll forming, bending, forging, punching, stretching, coiling, some other metalworking, or any combination thereof. A preferred forming process is a process that includes a step of stamping the composite material. The stamping process may occur at or near ambient temperatures. For example, the temperature of the composite material during stamping may be less than about 55° C., preferably less than about 45° C., and more preferably less than about 38° C. The forming process may involve drawing regions of the composite material to various draw ratios. In one aspect of the invention, the composite material is subjected to a step of drawing to a relatively high draw ratio without breaking, wrinkling, or buckling. For example, it is subjected to a step of drawing so that at least a portion of the composite is drawn to a draw ratio greater than 1.2. Desirably, the composite material may be capable of being drawn and is drawn to a maximum draw ratio greater than about 1.5, preferably greater than about 1.7, more preferably greater than about 2.1, and most preferably greater than about 2.5. The cracking limit of the draw ratio may be determined using the circular cup drawing test as described by Weiss et al. (M. Weiss, M. E. Dingle, B. F. Rolfe, and P. D. Hodgson, "The Influence of Temperature on the Forming Behavior of Metal/Polymer Laminates in Sheet Metal Forming", Journal of Engineering Materials and Technology, October 2007, Volume 129, Issue 4, pp. 534-535), incorporated herein by reference. The forming process may include a step applying a pressure to a die (e.g., a die having a hardness, as measured according to Mohrs hardness scale, greater than the hardness of the metallic fibers) in contact with the composite material.

During a stamping or drawing process, composites including a porous metallic fiber core (i.e., a core that is substantially free of thermoplastic and optionally including an adhesive layer) interposed between two metallic layers; the fibers tear and/or the two metallic layers delaminate, unless the concentration of fibers is high or the fiber is replaced with perforated metal containing at least about 28% metal by volume, as demonstrated by Mohr (Dirk Mohr, "On the Role of Shear Strength in Sandwich Sheet Deforming," International Journal of Solids and Structures, 42 (2005) 1491-1512). In the present invention, the failure mechanisms observed by Mohr are surprisingly overcome by employing a polymeric core layer having relatively low concentrations of metallic fiber (e.g., including less than about 28% metallic fiber based on the total volume of the core). Without being bound by theory, it is believed that the improved deformation characteristics at low metallic fiber concentration is related to the core layer being substantially or even completely free of pores and/or voids. The composite structures illustrated herein have an unexpectedly high amount of deformation (e.g., a relatively high draw ratio) prior to fiber tearing and/or delamination of the metallic layers.

A particularly preferred stamping or drawing process is a process that operates at greater than about 1 stroke (e.g., 1 part) per minute, more preferably greater than about 5 strokes per minute, even more preferably greater than about 25 strokes per minute, and most preferably greater than about 60 strokes per minute. The stamping process may include a blank holding force to hold a periphery of the blank (i.e., a periphery of the composite material being stamped). Preferably, the blank holding force is greater than about 0.03 kg/mm$^2$, more preferably greater than about 0.10 kg/mm$^2$, and most preferably greater than about 0.18 kg/mm$^2$. The stamping process may include one, two, or more drawing steps. Preferably, the maximum draw for the first draw of the stamping process (as measured by the maximum % reduction in thickness) is less than about 60%, more preferably less than about 50% and most preferably less than about 45%. In addition to drawing the material, the stamping process may include one or more steps of piercing the part, trimming the part, flanging the part, or any combination thereof, which may be a separate step or may be combined (e.g., with a drawing step).

Characteristics of Composites

The composite material, when tested according to the channel bending method (e.g., at 23° C.) described by Weiss et al. (M. Weiss, M. E. Dingle. B. P. Rolfe, and P. D. Hodgson, "The Influence of Temperature on the Forming Behavior of Metal/Polymer Laminates in Sheet Metal Forming," Journal of Engineering Materials and Technology, October 2007, Volume 129, Issue 4, pp. 530-537) may have a wall springback angle less than about 10%, preferably less than about 8%, more preferably than about 5%, and most preferably less than about 2%. When tested by the same method, the composite material may be characterized by a flange springback angle less than about 2%, preferably less than about 1.5%, and more preferably less than about 1.0%.

Preferably, the composite material is weldable (e.g., weldable using a resistance welding technique such as spot welding, seam welding, flash welding, projection welding, or upset welding) and has a relatively low electrical resistance. The teachings herein thus also contemplate one or more steps of welding the composite materials taught herein. The electrical resistance of the composite material in the through-direction may be described by the sum of the electrical resistance of the metallic layers and the core layer. Typically, the electrical resistance of the metallic layers is much less than the electrical resistance of the core layer, such that the electrical resistance of the composite material may be estimated by the electrical resistance of the core layer. The resistivity (e.g., the resistivity measured in the through-thickness direction, normal to the plane of a sheet) may be measured using AC modulation and determined from the voltage drop, V, and the current, I:

$$\text{Resistivity} = (V/I)(A/t)$$

where A is the area of the sheet, and is the thickness of the sheet. The resistivity (in the through-thickness direction) of the composite material, the core layer, or both, may be relatively low (e.g., the composite material, the core layer, or both, may be characterized by a resistivity less than about 100,000 Ω·cm, preferably less than about 10,000 Ω·cm, more preferably less than about 3,000 Ω·cm, and most preferably less than about 1,000 Ω·cm).

The composite materials of the present invention may provide for improved thermal characteristics compared with a monolithic metallic material having the same dimensions. Preferably, the composite material may have a relatively low thermal conductivity (e.g., the composite material may be a sheet having a relatively low thermal conductivity measured in the through-thickness direction, normal to the plane of the sheet). For example, a composite material according to the teachings herein have a thermal conductivity (e.g., in the through-thickness direction) that may be less than (preferably at least about 10% less than, more preferably at least about 50% less than, and most preferably is at least about 90% less than the thermal conductivity of a monolithic material having the same dimensions as the composite material and consisting of the same metal as used in a metallic layer of the composite. The thermal conductivity in the through-thickness direction of the composite material (measured at about 25° C.) preferably is less than about 25 W/m·°K, more preferably less than about 14 W/m·°K, even more preferably less than about 10 W/m·°K, even more preferably less than about 5 W/m·°K, and most preferably less than about 1 W/m·°K.

The composite material according to the teachings herein, may include a core layer that reduces acoustical transmission, reduces sound generation, reduces vibrations, or any combination thereof. The peak acoustical transmission (e.g., as measured according to SAE J1400), the peak vibration transmission, or both, through the composite material preferably may be less than the value for a monolithic material having the same dimensions, more preferably by at least 10%, even more preferably by at least 50%, and most preferably by at least 90%.

Microstructure of Weld

It is possible that weld joints made rising various composites taught herein may exhibit a variation of microstructures across the composite. For example, a joint might be characterized as having (on sides laterally flanking the weld) spaced apart metal where each sheet includes ferrite and optionally cementite (e.g., in a pearlite structure). The weld itself may be characterized as including ferrite, carbide, and optionally austenite (e.g., in a barite structure). Progressing along the material length, there may be an increase in the carbon content from the lateral locations of the weld joints.

Figure 3A:
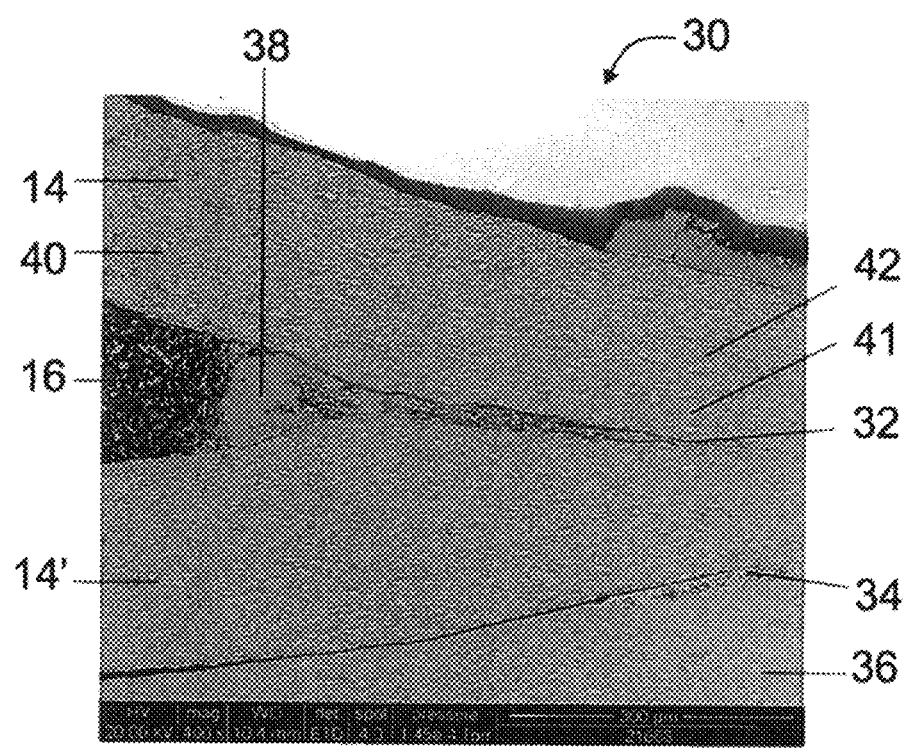
FIG. 3A is an illustrative micrograph of a cross-section near a weld bet between a composite material and a sheet metal.

Referring to FIG. 3A, a weld joint 30 may be formed between the composite material 12 (including a first metallic layer 14, a second metallic layer 14' and a polymeric core layer 16) and a second metallic material 36 (e.g., a second composite material or a monolithic metal material, such as a steel sheet). The weld joint will have at least two weld zones including a first weld zone 32 resulting from the welding of the first metallic layer 14 and the second metallic layer 14' and a second weld zone 34 resulting from the welding of the second metallic layer 14' and the second metallic material 36. The weld joint may also include a metal rich region 38 between the two metallic layers of the composite material and adjacent to the weld joint. The metal rich region may include metal that is squeezed out by the weld tips during a welding operation. For example, the metal, rich region may include or consist essentially of metal from metallic fibers in the composite. Without being bound by theory, it is believed that a welding operation may first melt the polymer under the weld tips and the weld pressure may force some or all of the polymer away from the weld (e.g., prior to melting of the metal), that a welding operation may melt some or all of the metallic fibers under the weld tips prior to melting the metallic layers, or both. The concentration of carbon in the metal (and thus the hardness) at various regions of the first metallic layer as shown in FIG. 3A (32, 40, 41, 42) may be the same or different, and preferably are the same. The microstructure of the first metallic layer near the weld zone 32, may be the same or different from the microstructure of the metallic layer away from the weld zone 40. Differences in microstructure may result from different concentration of iron, carbon, other metals, or any combination thereof (such as may arise from mixing of the first metallic layer with atoms from the second metallic layer, the metallic fibers, the polymer, or any combination thereof), or from differences in thermal treatment (such as from the heating and cooling cycle of the weld).

According to the teachings herein, the microstructure of the metal at the weld zone 2 may have the same microstructure (e.g., the same carbon concentration, the same crystal structures, such as a bainite structure, a pearlite structure, a pure ferrite structure, a martensite structure, an austenite structure, and the like, or any combination thereof) as obtained when welding the first metallic layer and the second metallic layer without a polymeric layer. As such it is surprisingly found that the polymeric layer, including both a thermoplastic and metallic fibers, may not affect the microstructure of the weld joint.

The process may include one or more steps subsequent to a welding step of treating the workpiece (i.e., the welded structure) such that a microstructure is changed. For example, the workpiece may be annealed, mechanically worked, or treated by a surface hardness modification step (e.g., a carborization of the surface). A step where a microstructure is changed may also be characterized as a step in which a phase transition occurs.

Figure 3B:
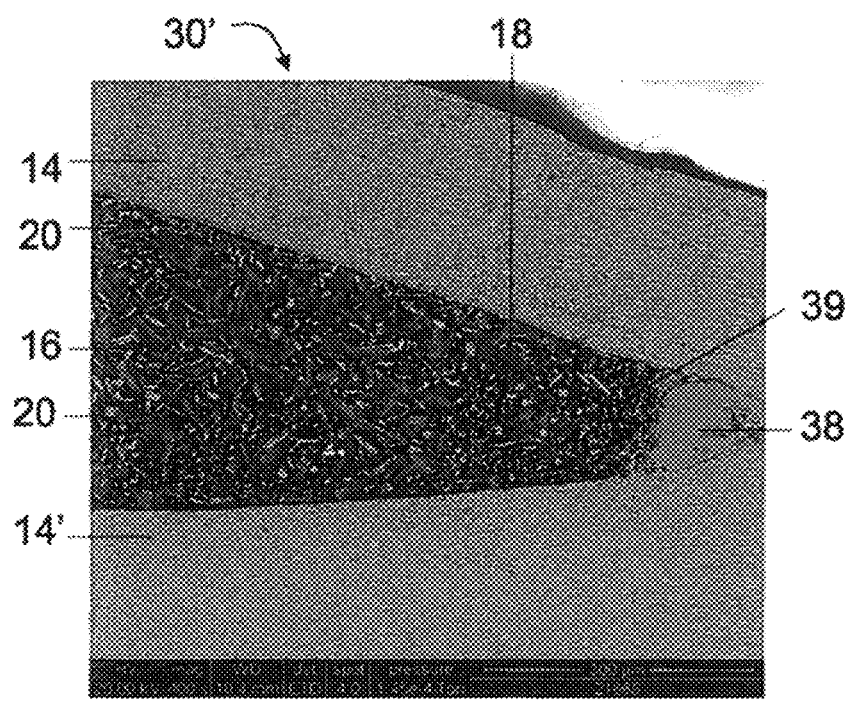
FIG. 3B is an illustrative micrograph of a cross-section near a weld between a composite material and a sheet metal.

FIG. 3B illustrates the microstructure in the region near a weld joint 30'. As illustrated in FIG. 3B, the polymeric layer 16 near the weld zone 32 may have varying concentrations of metallic fibers 20 and polymer 18 moving laterally from the weld zone. For example, the weld zone may be partially or even entirely encircled by a metal ring 38, and have one or more metallic fiber rich regions 39 (e.g., that may be formed when polymer is melted and squeezed out of the weld zone and out of regions near the weld zone). The thickness of the metallic layers 14 and 14' may have relatively little variation moving laterally away from the weld zone compared with the thickness of the polymeric layer which may have a relatively large variation. As illustrated in FIG. 3B, the thickness of the polymeric layer may be substantially reduced in the region 39 adjacent to the weld compared with the thickness of the polymeric layer prior to welding. For example thickness of the polymeric layer in the region adjacent to the weld joint may be reduced by at least 20%, preferably reduced by at least about 50%, and more preferably reduced by at least about 60% compared to the thickness of the polymeric layer prior to any welding operation.

As discussed above and illustrated in FIG. 3B, the weld joint may include a ring 38 of a metal partially encircling or entirely encircling the weld joint and preferably attached to the weld zone 32 of the weld joint. The ring may have any cross-section, such as a triangle, a rectangle, a trapezoid, a circle sector, and the like. As illustrated in FIG. 3, the ring may have a cross-section that has a generally circle sector shape. Without being bound by theory, it is believed that the ring is formed at least partially or even substantially entirety from the metallic fiber material (e.g., metallic fibers that are melted and squeezed out during the welding operation), and may be of a different metal than the metals on either side of the weld zone 32 (i.e., different metals from the first metallic layer and the second metallic layer). As such the weld joint may include a first metallic layer having a first metal in welded contact with a second metal of a second metallic layer, wherein the first metal and the second metal are the same or different; and a metallic ring at least partially encircling the weld zone (e.g., the weld zone defined by the region of contact of the first and second metallic layers), disposed between the first and second metallic layers, and attached to the first, second, or both metallic layers in the weld joint, wherein the metallic ring is of a metal that is different from the first metal and the second metal.

The composite materials of the present invention may be used in any number of applications requiring one or any combination of the properties described herein, including but not limited to relatively low density, relatively low thermal conductivity, relatively high stiffness to density ratio, or relatively low acoustical transmission. Exemplary applications which may employ the composite materials of the present invention may include automotive and other transportation related applications, building construction related applications, and appliance related applications. The composite materials may be used in applications such as an automotive panel, a track panel, a bus panel, a container (e.g., a container used for shipping), a panel on a train car, a panel on a jet, a tube (e.g., a bicycle tube), a motorcycle panel, a trailer panel, a panel on a recreational vehicle, a panel on a snowmobile, an automotive bumper fascia, a spoiler, a wheel well liner, an aerodynamic ground effect, an air dam, a container, a bed liner, a divider wall, an appliance housing, or a seat pan. The composite materials may be used as a building construction material, such as an exterior trim element, flashing, gutters, shingles, walls, flooring, countertops, cabinet facing, window frames, door frames, paneling, vents, ducts, planking, framing studies, shelving, plumbing fixtures, sinks, shower pans, tubs, and enclosures. An exemplary application is an vehicle body panel (e.g., a body outer skin of a vehicle such as an automobile). Automobile panels which may use the composite materials described herein include front quarter panels, rear quarter panels, door panels, hood panels, roof panels, otherwise. The automotive panel may have a class A, class B, or class C surface, preferably a class A or class B surface, and more preferably a class A surface. The composite materials herein may also include one or more decorative outer surfaces or veneers, such as a metal veneer, a wood veneer, a polymeric veneer, or otherwise. The outer surface may have a different texture, color or other appearance as an opposing layer. For example, a ferrous outer layer may be colored so that it simulates a copper color, a bronze color, a brass color, a gold color, or some other color.

The composite materials of the present invention may be used in a process that includes a step of coating the composite material, such as an electrocoating process, a paint process, a powder coat process, any combination thereof, or the like. If employed, the coating process may include one or more steps of cleaning or otherwise preparing the surface, one or more steps of heating or baking the coating (e.g., at a temperature greater than about 100° C., preferably greater than about 120° C.), or any combination thereof. The coating may be applied by any conventional means, such by a dipping process, a spraying process, or with a process employing an applicator such as a roller or a brush. As such, the composite material preferably is free of ingredients (e.g., low molecular weight ingredients) that leach out and contaminate a bath of a coating process, such as a bath of an electrocoat process. Likewise, methods herein include one or more coating steps that are free bath contamination due to an ingredient of the composite.

The composite material (e.g., a stamped part formed of the composite material) may be used in assembly which requires joining the composite material to one or more other materials or parts. For example the composite material may be mechanically joined to another part using a fastener, or chemically joined to another part using an adhesive, an adhesion promoter (e.g., a primer), or both. Other means of joining include welding, brazing, and soldering. One or any combination of these joining methods may be employed.

Preferably, the composite material does not delaminate (e.g., the metallic layer does not delaminate from the core layer) during the processing of the composite material to form a part or an assembly. As such, the composite material preferably does not delaminate during a stamping operation, during a joining operation (e.g., during a welding operation), or both. The composite material may be substantially free of gas pockets where gas at an elevated pressure has accumulated between layers. One or more layers may include one or more apertures to vent any accumulated gas. For example, a plurality of perforations in a metal layer may surround a weld site, and allow any gas to escape that may arise due to welding. It is also possible that the polymeric layer includes one or more cells into which gas may migrate to avoid pressure build up. Similar results are expected by use of plain, carbon steel or other steel fibers.

Properties discussed herein may be exhibited over an entire part mad using the composite materials herein, or over only a portion of it. Parts may be characterized as exhibiting substantially no visible detectable read through of any fibers (i.e. an outer show surface is free of visibly detectable (e.g., by the naked eye)) surface deformations that would be the result of compression of the layers with fibers between them. It is possible that, prior to any welding, the microstructure of the metals may be substantially continuous across at least a portion if not the entirety of the part.

It may be possible to selectively induce property differences at predetermined locations across a part.

Another aspect of the invention contemplates a method for post-consumer reclamation, recycling, or both of parts made using the present invention. One approach envisions providing a part having the composite structure taught herein, and subjecting it to a step of separating hydrocarbon compounds (e.g., by an elevated temperature heating step) from the metallic materials. Either or both of the hydrocarbon compounds or the metallic materials can be recovered and re-used.

It should be appreciated that the compositions of the following examples may be varied by about ±20% and give similar results (e.g., within about ±20%). Further, other materials taught herein may be substituted for those stated and similar results are contemplated.

EXAMPLES

Example 1

The core material for the light weight composite is prepared by melt blending about 45 g nylon 6 and about 72 g stainless steel fibers having an average diameter of about 3-10 μm and an average length of about 2-4 mm in a Brabender Plastograph mixer at 260° C., with a speed of about 20 rpm. The nylon 6 has a density of about 1.142 g/cm$^3$ and the steel has a density of about 7.9 g/cm$^3$. After mixing for about 60 minutes, the admixture is removed from the Brabender mixer. Thus prepared, example 1 contains about 18.8 volume % steel fibers and about 81.2 volume % nylon 6 and has a density of about 2.411 g/cm$^3$.

Example 2

A core material is prepared using the same method as for Example 1, except the weight of the stainless steel fiber is about 102 g and the weight of the nylon 6 is about 40 g. Thus prepared, the admixture contains about 26.9 volume % steel fibers and about 73.1 volume % nylon 6 and has a density of about 2.962 g/cm$^3$.

Example 3

A core material is prepared using the same method as for Example 1, except the weight of the stainless steel fiber is about 48 g and the weight of the nylon 6 is about 53.5 g. Thus prepared, the admixture contains about 15 volume % steel fibers and about 85 volume % nylon 6 and has a density of about 2.157 g/cm$^3$.

Example 4

A core material is prepared using the same method as for Example 1, except the weight of the stainless steel fiber is about 35.4 g and the weight of the nylon 6 is about 50.6 g. Thus prepared the admixture contains about 10 volume % steel fibers and about 90 volume % nylon 12 and has a density of about 1.816 g/cm$^3$.

Comparative Example 5

A core material is prepared using the same method as for Example 1, except no stainless steel fiber is used and about 53 g of the nylon 6 is mixed in the Brabender Plastograph mixer. Comparative Example 5 has a density of about 1.142 g/cm$^3$.

Comparative Examples 6-7

Composite materials are prepared by compression molding a sandwich panel containing two steel plates, each having a thickness of about 0.20 mm a length of about 74.2 mm and a width of about 124.2 mm, and the Nylon 12, without metallic fibers, is placed between the metal plates. The steel plates are made of No. 5 temper Aluminum killed) low carbon steel that meets AISA 1008 and ASTM A109 standards. The thickness of the core material for comparative examples 6 and 7 is about 0.30 mm and about 0.44 mm, respectively, as shown in Table 1. Comparative Example 6 and 7 are compression molded using a positive mold at a temperature of about 250° C., and a load of about 12000 kg. The overall density of the composite panels is about 32-46 wt. % lower than the density of the steel used in the steel plates. The through-thickness electrical resistivity of comparative examples 6-7 is greater than $1 \times 10^{10}$ Ω·cm, indicating that these panels have insulating characteristics. Though stampable, attempts to weld Comparative Examples 6-7 to a monolithic steel panel results in structure that do not weld together. These samples fail the weld test in that the weld is weaker than the panels being welded together.

Examples 8-9

Examples 8 and 9 are composite materials prepared by compression molding a sandwich panel using the method described for Comparative Examples 6-7, except a core material including about 26.9 volume % of steel fibers and about 73.1 volume % nylon 12 is used. The steel fibers in the core material have an average diameter of about 3-10 µm and an average length of about 2-4 mm and are mixed with the nylon 12 in a Brabender Plastograph mixer at about 260° C. The thickness of the core material is about 0.40 mm and about 0.57 mm for Examples 8 and 9, respectively. These samples are illustrated in Table 2. The overall density of the composite panels is about 29-36 wt. % lower than the density of the steel. These composite panels are welded to steel sheet having a thickness of about 0.8 mm using AC resistance welding (spot welding). Good welds (i.e., welds that are stronger than the panels being welded, such that a weld button is obtained when the welded panels are separated by force) are obtained using a welding current of about 9.7 kA and 8 weld cycles, with a pressure of about 600 psi. These conditions are lower than those required for welding two monolithic sheets of 0.8 mm thick steel (12.9 KA, 15 weld cycles, 600 psi pressure). Each weld cycle is about 1/60 second and the welding parameters include a slope of about 1 cycle (i.e., about 1/60 second), a hold time of about 10 cycles (i.e., about 1/6 second) and a squeeze time of about 1 second.

TABLE 1

|  | Comparative Example 6 | Comparative Example 7 |
|---|---|---|
| Metal Plate 1 | | |
| Material | Steel | Steel |
| Thickness, mm | 0.20 | 0.20 |
| Metal Plate 2 | | |
| Material | Steel | Steel |
| Thickness, mm | 0.20 | 0.20 |
| Core Material | | |
| Thickness, mm | 0.30 | 0.44 |
| Thickness, vol % of total | 43% | 57% |
| Metal Fiber, volume % of core | 0% | 0% |
| Nylon 12, volume % of core | 100% | 100% |
| Total Density, g/cm³ | 5.37 | 4.27 |
| Weight Saving, % | 32% | 46% |
| Core Layer Resistivity, Ω·cm | >10¹² | >10¹² |
| Weld Properties | Fail | Fail |

Examples 10-11

Examples 10 and 11 are composite materials prepared by compression molding a sandwich panel using the method described for Examples 8 and 9, except the metal plates have a thickness of about 0.30 mm each, and the samples are prepared with thickness of the core material of about 0.39 mm, and about 0.54 mm, respectively. These samples are illustrated in Table 2. The overall density of the composite panels is about 25-30 wt. % lower than the density of the steel. These composite panels are welded to steal sheet having a thickness of about 0.8 mm using AC resistance welding (spot welding). Good welds are obtained using a weeding current of about 9.7 kA and 8 weld cycles, with a pressure of about 600 psi.

TABLE 2

|  | Example 8 | Example 9 | Example 10 | Example 11 |
|---|---|---|---|---|
| Metal Plate 1 | | | | |
| Material | Steel | Steel | Steel | Steel |
| Thickness, mm | 0.20 | 0.20 | 0.30 | 0.30 |
| Metal Plate 2 | | | | |
| Material | Steel | Steel | Steel | Steel |
| Thickness, mm | 0.20 | 0.20 | 0.30 | 0.30 |
| Core Material | | | | |
| Thickness, mm | 0.40 | 0.57 | 0.39 | 0.54 |
| Thickness, vol % of total | 50% | 59% | 39% | 47% |
| Metal Fiber, volume % of core | 26.9% | 26.9% | 26.9% | 26.9% |
| Nylon 12, volume % of core | 73.1% | 73.1% | 73.1% | 73.1% |
| Total Density, g/cm³ | 5.61 | 5.04 | 5.91 | 5.55 |
| Weight Saving, % | 29% | 36% | 25% | 30% |
| Core Layer Resistivity, Ω·cm | 910 | 480 | <150 | 170 |
| Weld Properties | Good | Good | Good | Good |

Examples 12-13

Examples 12 and 13 are composite materials prepared by compression molding a sandwich panel using the method described for Comparative Examples 6-7, except a core material including about 20.2 volume % of steel fibers and about 79.8 volume % nylon 12 is used The steel fibers in the core material have an average diameter of about 3-10 µm and an average length of about 2-4 mm and are mixed with the nylon 12 in a Brabender Plastograph mixer at about 260° C. The thickness of the core material is about 0.37 and about 0.55 mm, for Examples 12 and 13 respectively. These samples are illustrated in Table 3. The overall density of the composite panels is about 31-41 wt. % lower than the density of the steel. These composite panels are welded to steel sheet having a thickness of about 0.8 mm using AC resistance welding (spot welding). Good welds are obtained using a welding current of about 9.7 kA and 8 weld cycles, with a pressure of about 60 psi.

The stiffness and density of Example 12 and a monolithic sheet of the same steel material used in the metallic layers of Example 12, both having a thickness of about 0.87 mm are measured in the through-thickness direction. Example 12 is expected to have a higher stiffness to density ratio than the monolithic sheet of steel.

TABLE 3

|  | Example 12 | Example 13 |
|---|---|---|
| Metal Plate 1 | | |
| Material | Steel | Steel |
| Thickness, mm | 0.20 | 0.20 |
| Metal Plate 2 | | |
| Material | Steel | Steel |
| Thickness, mm | 0.20 | 0.20 |
| Core Material (Example 1) | | |
| Thickness, mm | 0.37 | 0.55 |
| Thickness, vol % of total | 48% | 58% |
| Metal Fiber, volume % of core | 20.2% | 20.2% |
| Nylon 12, volume % of core | 79.8% | 79.8% |
| Total Density, g/cm$^3$ | 5.43 | 4.70 |
| Weight Saving, % | 31% | 41% |
| Core Layer Resistivity, Ω · cm | 740 | 500 |
| Weld Properties | Good | Good |

Example 14

Example 14 composite material sample is prepared by compression molding a sandwich panel using the method described for Comparative Examples 6, except Example 3 is used for the core material. This composite panel sample is welded to steel sheet having a thickness of about 0.8 mm using AC resistance welding (spot welding). Good welds are obtained using a welding current of about 927 kA and 8 weld cycles, with a pressure of about 800 psi.

Example 15

Example 15 composite material sample is prepared by compression molding a sandwich panel using the method described for Comparative Examples 6, except Example 4 is used for the core material. This composite panel sample is welded to steel sheet having a thickness of about 0.8 mm using AC resistance welding (spot welding). Good welds are obtained using a welding current of about 9.7 KA and 8 weld cycles, with a pressure of about 600 psi.

Example 16

A composite panel having dimensions of about 340 mm×540 mm and having the composition of Example 12 is prepared using a compression molding process. The composite panel is stamped such that sections of the panel have a draw ratio of about 3. After stamping it is expected that the panel is free of cracks and wrinkles and has a class A surface. It is further expected that the metallic fibers do not tear and the core layer does not delaminate from the metallic layers.

Example 17-25

Examples 17-19 are neat polymers and mixtures of polymers with stainless steel fibers prepared using the method Example 1. Examples 17-19 are prepared using nylon 6 with about 0 wt %, about 3 wt. %, and about 10 wt. % stainless steel fiber, respectively for Examples 17, 18, and 19. The tensile modulus of the core material of Example 17 is about 3.3 GPa. When the steel fiber is added concentration of about 3 wt. % (Example 18), the tensile modulus increases by more than to about 3.9 GPa. When the steel fiber is added at a concentration of about 10 wt. % (Example 19), the tensile modulus increases by more than 100% to about 7.3 GPa. The nylon is replaced with a copolyamide and the concentration of the stainless steel fiber is about 0% wt. %, about 3 wt. % and about 10 wt. % for Examples 20, 21, and 22, respectively. The tensile modulus of the core material of Example 20 is about 700 MPa. When the steel fiber is added at a concentration of about 3 wt % (Example 21), the tensile modulus increases by more than 60% to about 1160 MPa. When the steel fiber is added at a concentration of about 10 wt. % (Example 22), the tensile modulus increases by more than 200% to about 2280 MPa. The nylon is replaced with an ethylene vinyl acetate copolymer containing about 19 wt. % vinyl acetate and about 81 wt % ethylene, and the concentration of the stainless steel fiber is about 0% wt. %, about 3 wt. % and about 10 wt. % for Examples 23, 24, and 25, respectively. The neat ethylene vinyl acetate copolymer (Example 23) has a tensile modulus of about 40 MPa, an elongation at failure of about 680%, and a toughness of about 36 MPa. When the steel fiber is added at a concentration of about 3 wt. % (Example 24), the tensile modulus increases by more than 100% to about 110 MPa, the elongation at failure remains about the same at about 680%, and the toughness increases to about 47 MPa. When the steel fiber is added at a concentration of about 10 wt. % (Example 25), the tensile modulus increases by more than 400% to about 210 MPa, the elongation at failure is about 70%, and the toughness is about 3 MPa. As such, in general this and other embodiments of herein may be characterized by a tensile modulus of the filled polymeric material (e.g., the material of the core layer) including metallic fibers that is greater than the tensile modulus of the filled polymeric material (e.g., the material of the core layer) having the same composition but without metallic fibers preferably by at least 15%, more preferably by at least 50%, even more preferably by at least about 100%, and most preferably by at least about 200%.

Example 26

A composite sandwich sheet is prepared including low carbon steel face sheets and a composite layer including about 20 volume % stainless steel fibers and about 80 volume % nylon. The composite material is spot welded to a metal sheet made of low carbon steel. The welding conditions include a squeeze time of about 60 cycles (each cycle being about 1/60 second), a slope of about 1 cycle, a weld time of about 13 weld cycles, a current of about 5 kA, and a hold time of about 10 cycles.

Figure 3C:
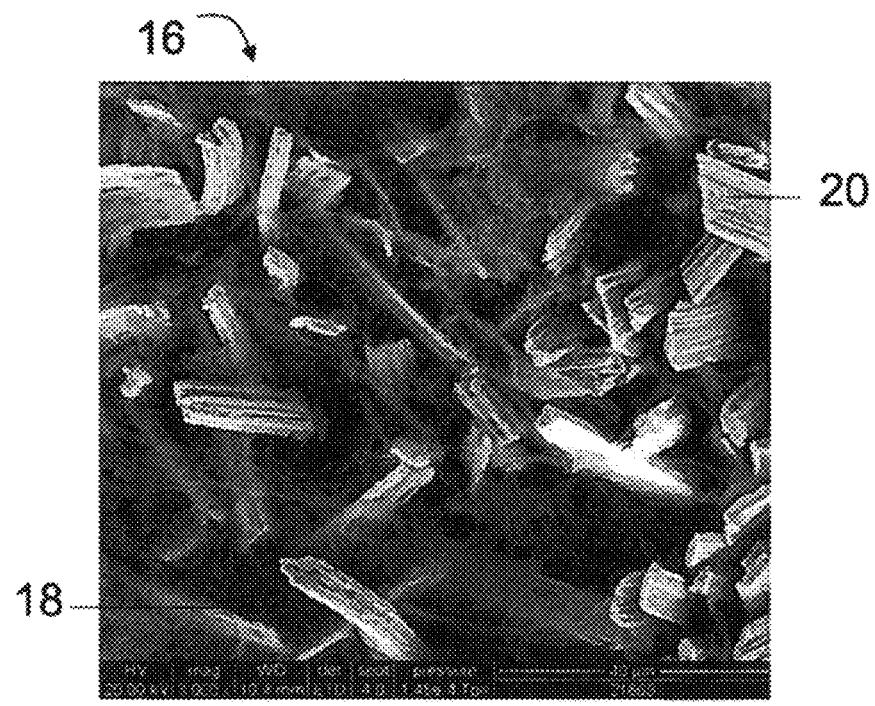
FIG. 3C is an illustrative micrograph et a polymeric material including metallic fibers.

The weld joint is sectioned, polished and studied by microscopy, microhardness, and energy dispersive x-ray spectroscopy (EDS). FIGS. 3A, 3B, and 3C are micrographs illustrating different regions and/or different magnifications of the sectioned weld joint.

The EDS and the microhardness (Vickers hardness as measured according to ASTM E 384-08) show that the carbon concentration of the first metallic layer has essentially no variation (e.g., between regions 32, 40, 41, and 42), except for a small amount of stainless steel near the weld zone 32. The EDS and microhardness studies show that the metallic region 38 near the weld zone consists essentially of stainless steel (i.e., the steel used in the metallic fibers). In regions near the weld zone, the microstructure of the first metallic layer is representative of bainite and includes ferrite. In other regions, away from weld (e.g., at the location marked by 40), the first metallic layer has pure ferrite grains.

Examples 27-34 (Electrical Resistivity)

Examples 27 through 34 are prepared by mixing steel fibers thermoplastic using the steel fiber concentration shown in TABLE 4 in a Brabender mixer. The composite materials are then prepared by molding sandwiches having 0.4 mm of the fiber filled thermoplastic layer between two 0.2 mm thick steel sheets. The through-thickness electrical resistivity of the composite materials, as measured using AC Modulation, is shown in TABLE 4. All of the composite materials filled thermoplastics have relatively low electrical resistivity and of the unfilled thermoplastics have relatively high electrical resistivity.

TABLE 4

|  | Thermoplastic | Steel Fibers (Volume %) | Electrical Resistivity $\Omega \cdot cm$ |
|---|---|---|---|
| Example 27 | Nylon | 0 | >$10^{11}$ |
| Example 28 | Nylon | 26.9 | 250 |
| Example 29 | Nylon | 20 | 250 |
| Example 30 | Nylon | 15 | 270 |
| Example 31 | Nylon | 10 | 300 |
| Example 32 | EVA | 0 | >$10^{11}$ |
| Example 33 | EVA | 3 | 400 |
| Example 34 | Copolyamide | 3 | 600 |

As used herein, unless otherwise stated, the teachings envision that any ember of a genus (list) may be excluded from the genus; and for any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "x" parts by weight of the resulting polymeric blend composition "also contemplates a teaching of ranges of same r amount of "x" in percent by weight of the resulting polymeric blend composition."

Unless otherwise stated, all ranges include both endpoints and all numbers between the endpoints. The use of "about" or "approximately" in connection, with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps, identified, and such other elements ingredients, components or steps that do not materially affect the basic and novel characteristics of combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and copolymer" and "homo- and copolymerization", respectively.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be, determined with reference to the appended claims, along with the full scope of equivalents to which such claims are entitled. The disclosures of all articles and references, including patent applications and publications, are incorporated by for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:
1. An article comprising:
   a light weight composite having
   (i) a first metal foil;
   (ii) a second metal foil; and
   (iii) an extruded polymeric core layer interposed between the first and second metal foils; wherein the polymeric core layer includes:
      a synthetic elastomer having either or both of a tensile modulus at 100% elongation of less than about 3 MPa, a tensile elongation at break greater than about 110%, both measured according to ASTM D638-08 at a nominal strain rate of about 0.1; and from about 3 volume percent to less than about 30 volume percent metal fibers based on the total volume of the polymeric core layer;
   wherein
   the polymeric core layer has an apparent modulus of rigidity according to ASTM D1043-02 of at least about 200 MPa over a temperature range of about −40° C. to about 50° C.; the metal fibers have a weight average length from about 5 μm to about 25 mm; and the composite material is stamped and welded to a metal material.

2. The article of claim 1, wherein the polymeric core layer comprises a thermoplastic polymer including a polyethylene copolymer of one or more α-olefins and optionally one or more additives wherein the polyethylene copolymer includes at least about 80 weight % ethylene polymer and has a peak melting temperature as measured according to ASTM D3418-08 or a glass transition temperature as measured according to ASTM D3418-08 above about 80° C. and below about 250° C.

3. The article of claim 1, wherein the concentration of pores and voids in the polymeric core layer is from 0 to about 10 volume %, based on the total volume of the polymeric core layer.

4. The article of claim 2, wherein the thermoplastic polymer has a number average molecular weight greater than about 20,000;
the concentration of any grafted polymer in the polymeric core layer is up to about 10 wt. %, based on the total weight of the polymeric core layer;
the first metal foil includes steel, the part is welded to a steel part and the metal fibers include plain carbon steel fibers; and
the thermoplastic polymer has a crystallinity of about 10% or more.

5. The article of claim 4, wherein the metal fibers are chopped fibers and have a weight average length of about 5 μm to 8 mm.

6. The article of claim 5, wherein metal fibers are present in an amount from about 5 volume percent to 20 volume percent, based on the total volume of the polymeric core layer;
and the thickness of one or both of the first and second metal foils is 0.15 mm or more.

7. The article of claim 1, wherein the first metal foil and the second metal foil each have a first surface facing the polymeric core layer, wherein the polymeric core layer contacts at least 70% of the first surfaces of the first and second metal foils.

8. The article of claim 1, wherein the composite material includes an edge region sealed by crimping and/or bending the composite material.

9. The article of claim 1, wherein the composite material includes an edge region sealed by an attached cover.

10. The article of claim 1, wherein the composite material includes an edge region sealed by welding, soldering or brazing.

11. The article of claim 1, wherein the composite material includes a spacer entirely interposed between the first and second metal foils.

12. The article of claim 1, wherein the composite material includes a spacer partially interposed between the first and second metal foils.

13. The article of claim 12, wherein the spacer includes a first region having a first thickness and interposed between the first and second metal foils and a second region having a second thickness greater than the first thickness, wherein the second regions is located away from the first and second metal foils.

14. The article of claim 8, wherein the article includes a laser weld joint joining the composite material and the metal material.

15. The article of claim 9, wherein the article includes a laser weld joint joining the composite material and the metal material.

16. The article of claim 10, wherein the article includes a laser weld joint joining the composite material and the metal material.

17. The article of claim 11, wherein the article includes a laser weld joint joining the composite material and the metal material.

18. The article of claim 12, wherein the article includes a laser weld joint joining the composite material and the metal material.

19. The article of claim 1, wherein the composite material has a cover over one or more edges.

20. The article of claim 1, wherein the cover is a coating or a lamination over the one or more edges.

* * * * *

UNITED STATES PATENT AND TRADEMARK OFFICE
CERTIFICATE OF CORRECTION

PATENT NO. : 9,889,634 B2
APPLICATION NO. : 15/227495
DATED : February 13, 2018
INVENTOR(S) : Shimon Mizrahi Page 1 of 1

It is certified that error appears in the above-identified patent and that said Letters Patent is hereby corrected as shown below:

Column 40, Line 39 delete "article of claim 1," and insert --article of claim 19,--

Signed and Sealed this
First Day of May, 2018

Andrei Iancu
*Director of the United States Patent and Trademark Office*